United States Patent [19]
Ito et al.

[11] Patent Number: 5,794,845
[45] Date of Patent: Aug. 18, 1998

[54] FLOW CONTROL DEVICE AND HOT-WATER TYPE HEATING APPARATUS EMPLOYING THE SAME

[75] Inventors: Koichi Ito; Yoshihiko Okumura, both of Kariya; Yoshimitsu Inoue, Chiryu, all of Japan

[73] Assignee: Denso Corporation, Kariya, Japan

[21] Appl. No.: 838,621

[22] Filed: Apr. 11, 1997

[30] Foreign Application Priority Data

| | | | |
|---|---|---|---|
| Apr. 12, 1996 | [JP] | Japan | 8-091439 |
| Nov. 8, 1996 | [JP] | Japan | 8-296881 |

[51] Int. Cl.⁶ ................................................. B60H 1/02
[52] U.S. Cl. .................. 237/12.3 B; 237/2 A; 237/8 R; 237/56
[58] Field of Search .................. 237/12.3, 12.3 B, 237/2 A, 8 R, 56

[56] References Cited

U.S. PATENT DOCUMENTS

| | | | |
|---|---|---|---|
| 4,300,720 | 11/1981 | Baier et al. | 237/12.3 B |
| 4,905,893 | 3/1990 | Kiskis | 237/12.3 B |
| 5,273,105 | 12/1993 | Higashihara et al. | |
| 5,566,881 | 10/1996 | Inoue et al. | |

FOREIGN PATENT DOCUMENTS

| | | |
|---|---|---|
| A0138409 | 8/1982 | Japan . |
| B2-61-10327 | 3/1986 | Japan . |
| 4-39614 U | 4/1992 | Japan . |
| A-4-173423 | 6/1992 | Japan . |
| A-5-155241 | 6/1993 | Japan . |
| 686064 | 1/1953 | United Kingdom . |

*Primary Examiner*—Henry A. Bennett
*Assistant Examiner*—Derek S. Boles
*Attorney, Agent, or Firm*—Harness, Dickey & Pierce PLC

[57] ABSTRACT

A plurality of flow control valves is correspondingly provided to a plurality of heater core portions. Each of the flow control valves is provided with a first restriction portion formed in an inlet for receiving hot water, a second restriction portion in an outlet for introducing hot water to the respective heating heat exchange portions, and a bypass opening opened at an intermediate pressure portion between the first restriction portion and the second restriction portion. Each opening area of the first restriction portion, the second restriction portion, and the bypass openings is regulated by a cylindrical valve. The first and second restriction portions, the bypass openings and the valve bodies are accommodated within a common housing, and a bypass passage communicating with the bypass openings is formed in the common housing.

14 Claims, 17 Drawing Sheets

TO BYPASS PASSAGE 9

TO HEATER CORE PORTIONS 6,7

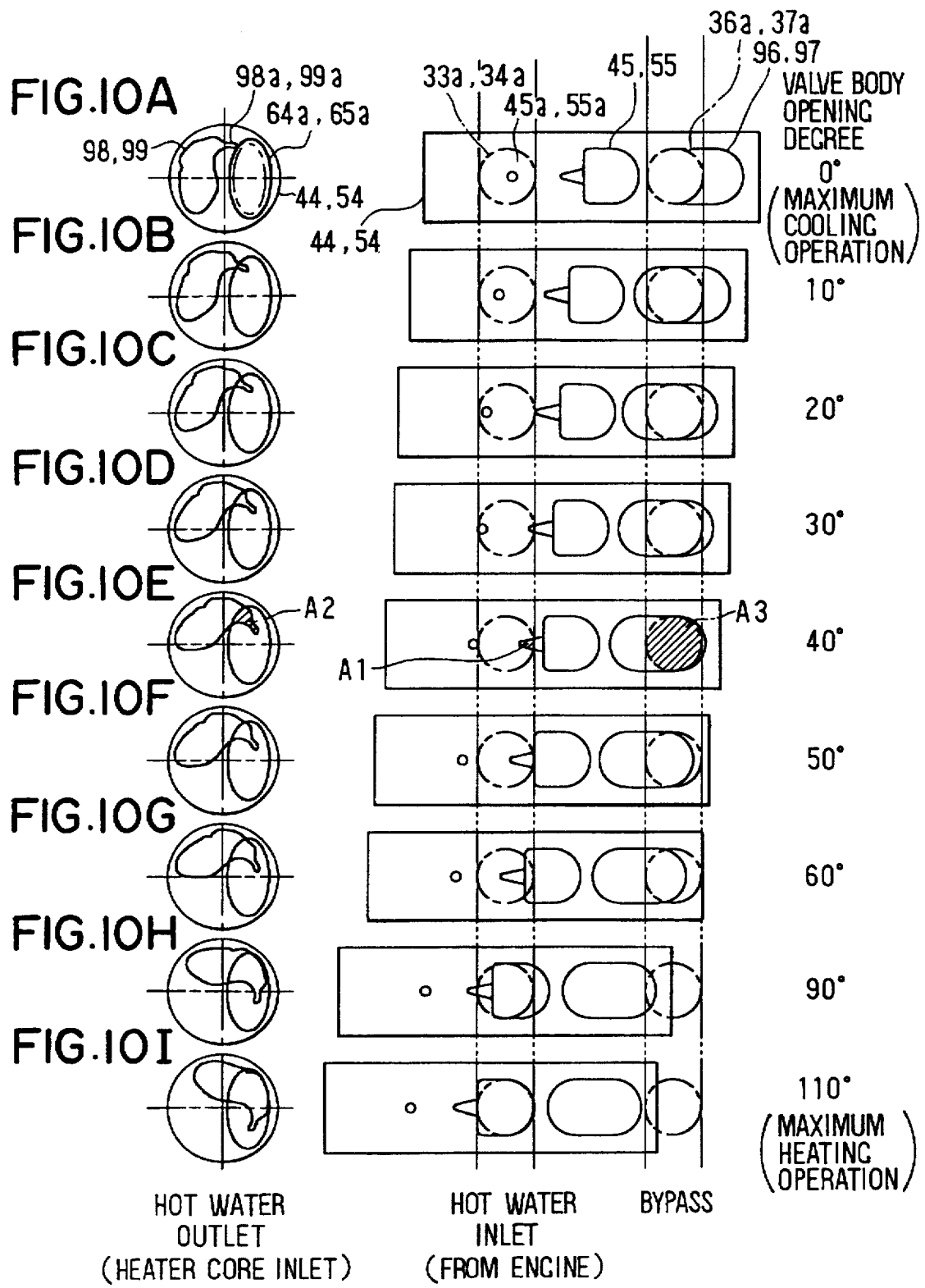

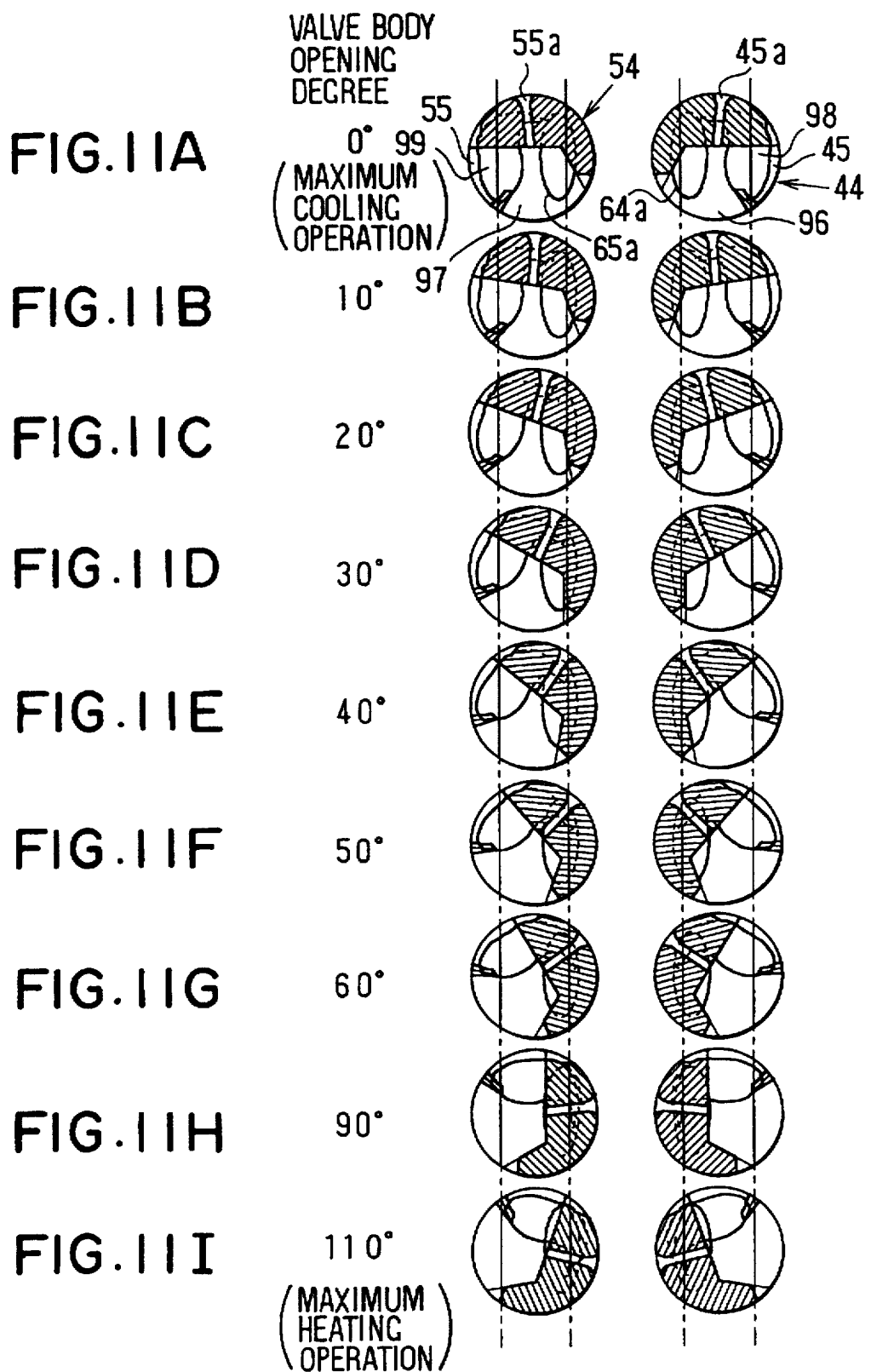

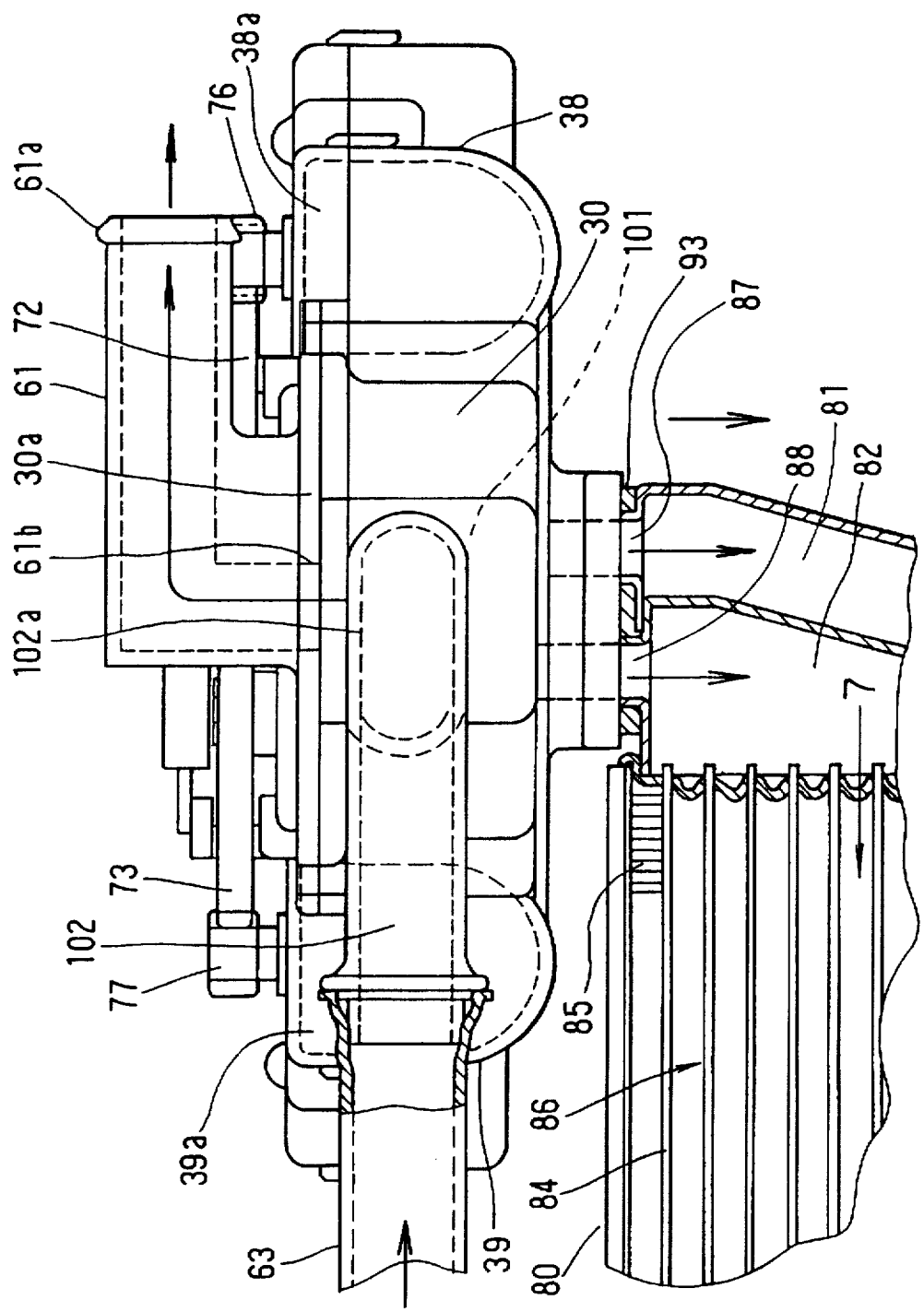

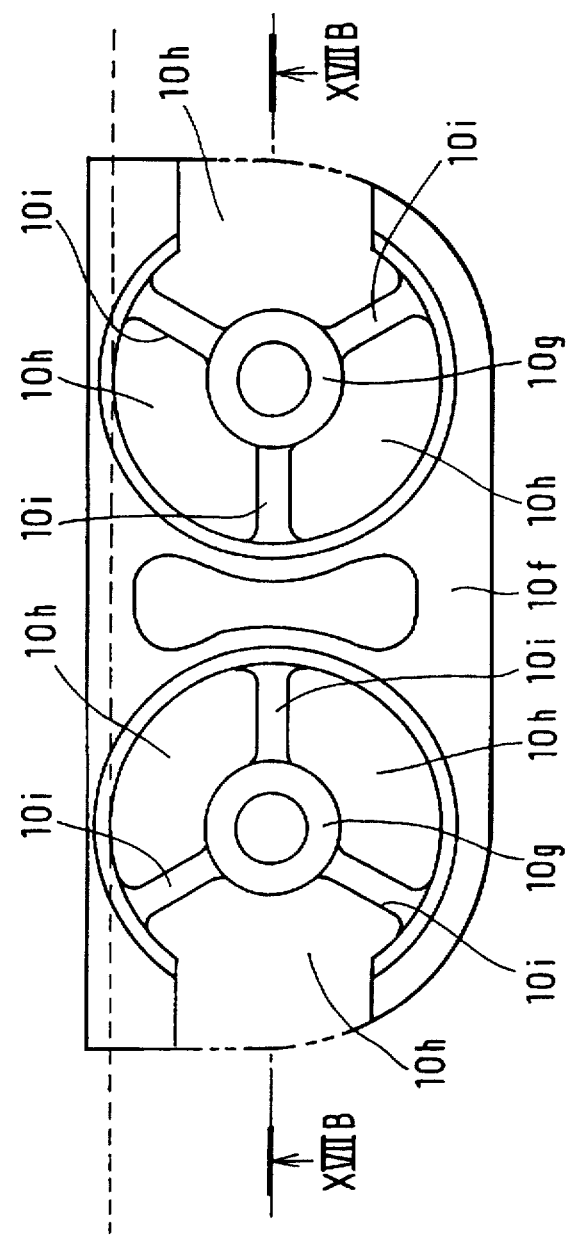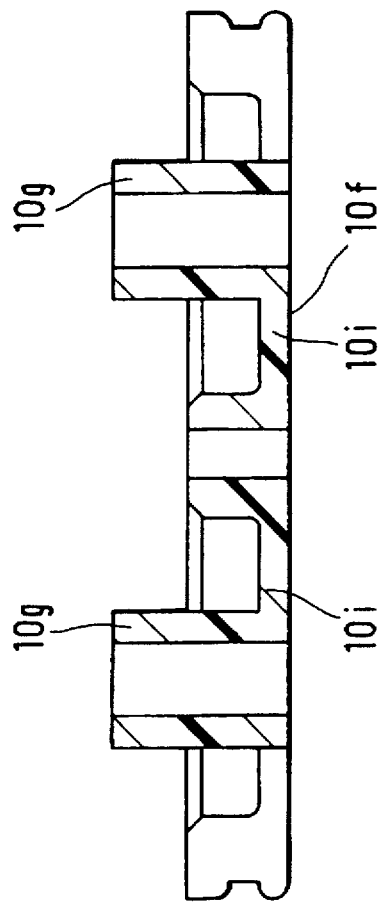
FIG. 17A
FIG. 17B

FLOW CONTROL DEVICE AND HOT-WATER TYPE HEATING APPARATUS EMPLOYING THE SAME

CROSS-REFERENCE TO RELATED APPLICATION

This application is related to and claims priorities from Japanese Patent Applications No. 8-91439 filed on Apr. 12, 1996, and No. 8-296881 filed on Nov. 8, 1996, the contents of which are hereby incorporated by reference.

BACKGROUND OF THE INVENTION

1. Field of the Invention

The present invention relates to a flow control device for controlling hot-water flow and a hot-water type heating apparatus employing the same, and particularly, to such a device employed in a hot-water type heating apparatus having a plurality of heat exchange portions for heating air by hot-water, for independently controlling the flow of hot-water supplied to the plurality of heat exchange portions to independently control temperature of air blowing into a plurality of spaces to be air-conditioned in a passenger compartment.

2. Description of Related Art

A conventional temperature control method for controlling the temperature of blown-air of an automotive air-conditioning apparatus including a hot-water type heater apparatus, includes a plurality of heat exchange portions for heating air by hot-water and independently controls hot-water flow supplied to the plurality of heat exchange portions to control the respective temperature of air blown to a plurality of spaces in a vehicle compartment, for example, a space of driver's seat side and a space of the passenger's seat side next to the driver's seat in the vehicle compartment.

The method is generally called as a "right and left independent temperature control method". In the method, because the flow of hot-water supplied to the plurality of heat exchange portions are independently controlled, a plurality of the respective flow control valves are generally disposed at hot-water passages of each heat exchange portion.

In the conventional method, the respective flow control valves are independently disposed in each heat exchange portion. Therefore, the flow control valves protrude from each heat exchange portion, a large dead space is formed around the protrusions of the flow control valves, a space for installing the flow control valves is increased due to the large dead space to increase a size of the entire hot-water type heating apparatus, so that it is difficult to install the hot-water type heating apparatus into a small restricted space such as a vehicle.

SUMMARY OF THE INVENTION

In view of the foregoing problems, it is an object of the present invention to provide a small-sized flow control device in which a plurality of flow control valves are provided in a common housing.

It is another object of the present invention to provide a flow control device for accurately controlling a small amount of hot-water flowing into a plurality of heating heat exchange portions.

According to the present invention, in a flow control device, a plurality of flow control valves are provided correspondingly to a plurality of heating heat exchange portions. Each of said flow control valves includes a first restriction portion in an inlet for receiving hot water from said hot water supply source, a second restriction portion in an outlet for introducing hot water to the respective heating heat exchange portions, a bypass opening opened at an intermediate pressure portion between the first restriction portion and the second restriction portion, and a valve body for controlling each opening area of the first restriction portions, the second restriction portion, and the bypass opening. The plurality of the first restriction portions, the second restriction portions, bypass openings, and the valve bodies are accomodated in a common housing. In the common housing, there is formed a bypass passage communicating with the bypass openings and bypassing the plurality of heating heat exchange portions. Each of the valve bodies is independently controlled by valve body driving means.

In this way, since the plurality of flow control valves are accommodated in the common housing, the entire size of a flow control device having the plurality of flow control valves can be decreased so that the flow control device can be installed in a small space. Since the flow control device becomes small-sized, the manufacturing cost can be reduced.

When the amount of the hot-water is controlled to a minute value to decrease the temperature of air blown from the plurality of heating heat exchange portions, both of the opening areas of first restriction portion at the hot-water inlet side and second restriction portions at the hot-water outlet side are restricted (double restriction), and an intermediate pressure portion between the first and second restriction portions is communicated with a bypass passage. In this way, the pressure of the hot-water applying to the plurality of heating heat exchange portions can be made sufficiently small.

As a result, a small amount of hot-water flow can be accurately controlled without forming small openings in each valve body. Therefore, it is possible to sufficiently prevent extraneous materials such as casting grain from choking up the passages of the flow control valves, and temperature of air blown from the heating heat exchange portions can be accurately controlled in a wide range from a low temperature to a high temperature.

Further, bypass openings of the plurality of valve bodies may be communicated with a common bypass passage. Therefore, the flow control device has a further decreased size and a simple structure.

Further, a pressure valve may be provided in a bypass passage to open when pressure of hot-water increases. In this way, the hot-water pressure applied to the heating heat exchange portions is maintained at a certain pressure even if pressure of hot-water supplied from an engine is changed, so that the variation in a temperature of the blown-air can be suppressed.

BRIEF DESCRIPTION OF THE DRAWINGS

Additional objects and advantages of the present invention will be more readily apparent from the following detailed description of preferred embodiments when taken together with the accompanying drawings, in which:

FIGS. 10A–10I development diagrams of the valve bodies of the flow control valves, which correspond to cross-sectional views taken along line X—X in FIG. 9;

FIGS. 11A–11I are cross-sectional views taken along line XI—XI in FIG. 9;

FIG. 16 is front view of the flow control valve according to the third embodiment;

FIG. 17A is a front view showing a supporting plate of a coil spring of a constant-differential pressure valve according to the third embodiment, FIG. 17B is a cross-sectional view taken along line XVIIB—XVIIB in FIG. 17A;

DETAILED DESCRIPTION OF THE PRESENTLY PREFERRED EMBODIMENTS

Preferred embodiments of the present invention are described hereinafter with reference to the accompanying drawings.

A first embodiment of the present invention will be described.

Figure 1:
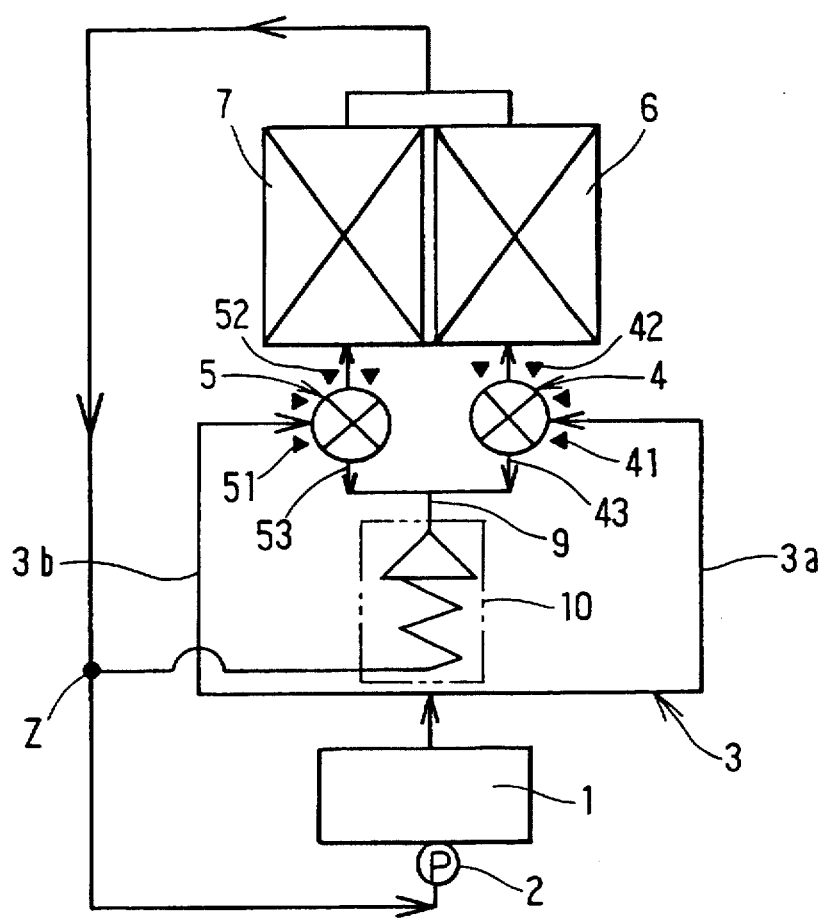
FIG. 1 is a hot-water circuit diagram showing a first embodiment of the present invention.

FIGS. 1 through 11 indicate the first embodiment of the present invention, and indicate an application of the present invention in a hot-water type heating apparatus of an air conditioning apparatus for a vehicle. As shown in FIG. 1, a water pump 2 is mechanically connected to a shaft of a water-cooled engine 1 and is driven by the engine 1. Hot-water circulates in a hot-water circuit 3 of the engine 1.

The hot-water circuit 3 is branched into a first passage 3a and a second passage 3b, and first and second flow control valves 4 and 5 are formed in the first and second passages 3a and 3b, respectively.

A first heater core portion 6 and a second heater core portion 7 are disposed in series at a downstream side of the first and second flow control valves 4 and 5 in a hot-water flow direction, respectively. The first and second passages 3a and 3b joins together at a downstream side of the first and second heater core portions 6 and are connected to an intake side of the water pump 2.

The first and second flow control valves are three-way type flow control valves each having three hot-water inlets/outlets, and each have first and second restriction portions 41, 42, 51 and 52. Bypass openings 43 and 53 are opened at intermediate pressure portions between the first restriction portions 41 and 51 and the second restriction portions 42 and 52, respectively, and are connected to a common bypass passage 9. A common constant-differential pressure valve (or pressure-responsive valve) 10 is located in the bypass passage 9.

The constant-differential pressure valve 10 opens the valve when the differential pressure between the front and back of the valve 10 reaches a predetermined value, and functions to make inlet and outlet pressures of the heater core portions 6 and 7 substantially equal even if the discharge pressure of the water pump 2 fluctuates due to speed fluctuation of the engine 1. Structures of the first and second flow control valves 4 and 5 will be specifically described below.

Next, a ventilating system of an air conditioning apparatus will be described briefly with reference to FIG. 2. An air conditioning duct 11 includes an air passage for leading air into a passenger compartment. At an end side of the air conditioning duct 11, there are formed an air inlet 12 for intaking inside air (i.e., circular air) or outside air (i.e.,fresh air) from an inside air inlet and an outside air inlet of an inside/outside air selected box (not shown). At the other end side of the air conditioning duct 11, there are formed a plurality of groups of outlets 13 and 14.

A blower 15 is composed of a centrifugal-type multiple-vane fan, and blows air intaked from the air inlet 12 toward the groups of outlets 13 and 14. A cooling heat exchanger 16 is for cooling air blown from the blower 15, and is specifically an evaporator which is located in a refrigerant cycle (not shown) and cools air by a latent heat of the evaporation of the refrigerant.

The first heater core portion 6 and the second heater core portion 7 are disposed in parallel at an air downstream air side of the evaporator 16 in a manner as to cross the air conditioning duct 11. Therefore, the entire air passing through the evaporator 16 are re-heated in the heater core portions 6 and 7. In the heater core portions 6 and 7, hot-water supplied from the engine 1 is heat-exchanged with air blowing in the air conditioning duct 11, so that the heater core portions 6 and 7 constructs a heating heat exchanger for heating blown-air.

A partition plate 17 is formed at an air downstream side of the heater core portions 6 and 7. By the partition plate 17, an air downstream passage of the heater core portions 6 and 7 is separated into a driver's seat side passage and the passenger's seat side passage 19. The group of outlets 13 is formed at a downstream side of the driver's seat side passage 18 to blow air passing through the first heater core portion 6 toward the driver's seat side in the passenger compartment. The group of outlets 14 is formed at downstream side of the next seat side passage 19 to blow air passing through the second heater core portion 7 toward the passenger's seat in the passenger compartment.

Thus, an amount of hot-water supplied to the heater core portions 6 and 7 can be independently controlled, so that the temperature of air blown from the passages 18 and 19 can be independently controlled.

Specifically, the group of outlets 13 is composed of a driver's seat side face outlet for blowing air toward the upper half body of a driver in the passenger compartment, a driver's seat side foot outlet for blowing air toward the lower half body of the driver in the passenger compartment, and a defroster outlet for blowing air toward the inside surface of a windshield.

Similarly, the group of outlets 14 is composed of a passenger's seat side face outlet for blowing air toward an upper half body of a passenger at the passenger's seat next to the driver's seat in the passenger compartment, a passenger's seat side foot outlet for blowing air toward the lower half body of the passenger at the passenger's seat in the passenger compartment, and the defroster outlet.

In the first embodiment, opening degrees of the first and second flow control valves 4 and 5 are automatically controlled by an electronic control unit (ECU) 20. Each of signals from an inside air temperature sensor 21 for detecting a temperature in the passenger compartment, an outside air temperature sensor 22 for detecting a temperature of the outside air, a sunlight sensor 23 for detecting an amount of sunlight entering the passenger compartment, a temperature sensor (not shown) for detecting a temperature of air blown from the first heater core portion 6, and a temperature sensor (not shown) for detecting a temperature of air blown from the second heater core portion 7 and the like is input to the ECU 20.

Further, temperature setting signals from a temperature setting device 24 for driver's seat and a temperature setting device 25 for the passenger's seat are input to the ECU 20. The temperature setting devices 24 and 25 are disposed on an air conditioning panel (not shown) located in an instrument panel at a front side of the passenger compartment.

The ECU 20 is a control device composed of a microcomputer and circuits around the microcomputer and the like.

The ECU 20 performs predetermined processes based on input signals from the sensors 21 through 23 and the temperature setting devices 24 and 25 and the like, and outputs control signals of valve opening degrees to the first and second flow control valves 4 and 5.

Figure 3:
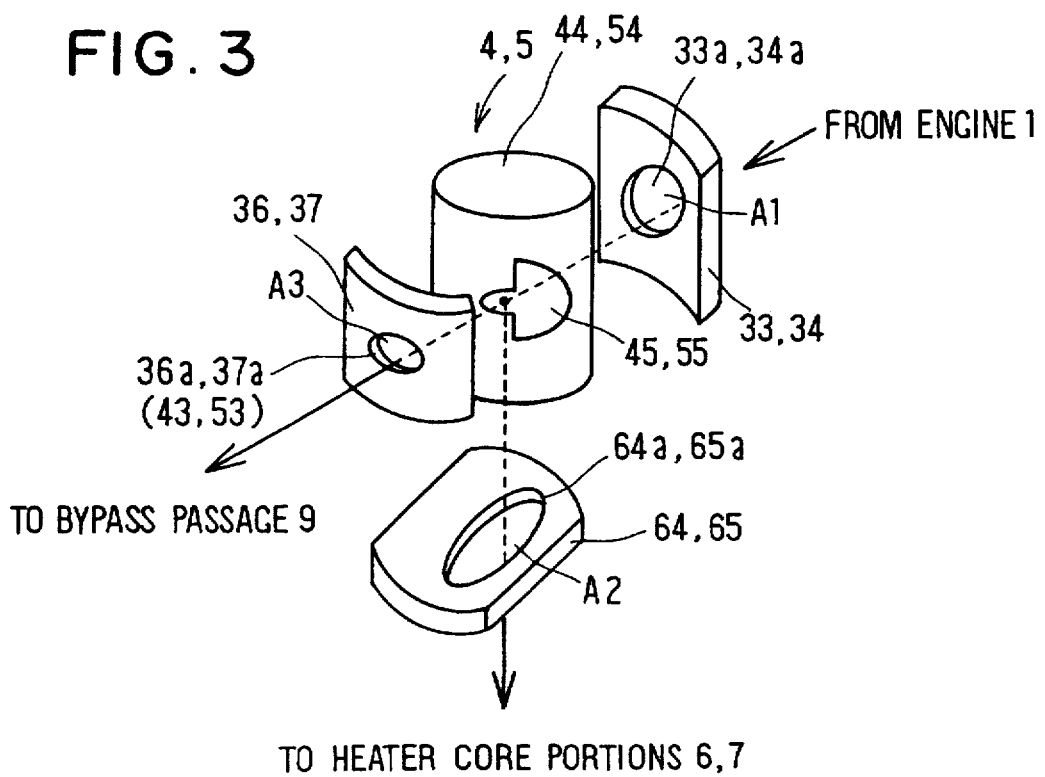
FIG. 3 is a main exploded perspective view showing flow control valves according to the first embodiment of the present invention.
Figure 4:
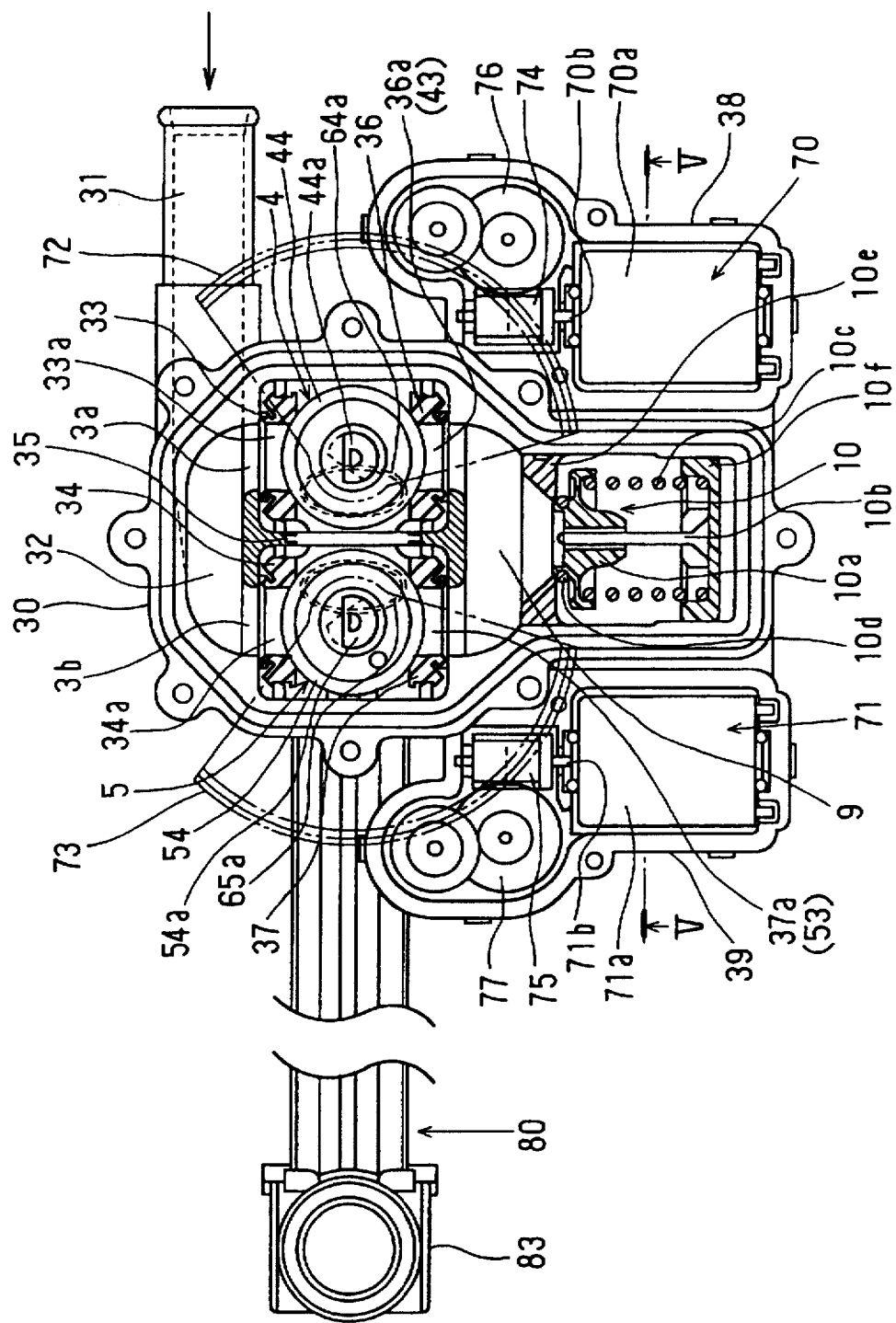
FIG. 4 is a partial cross sectional plan view showing an integrated state of the flow control valves and the heater core portions of the first embodiment when an upper cover of the flow control valve is taken out.
Figure 5:
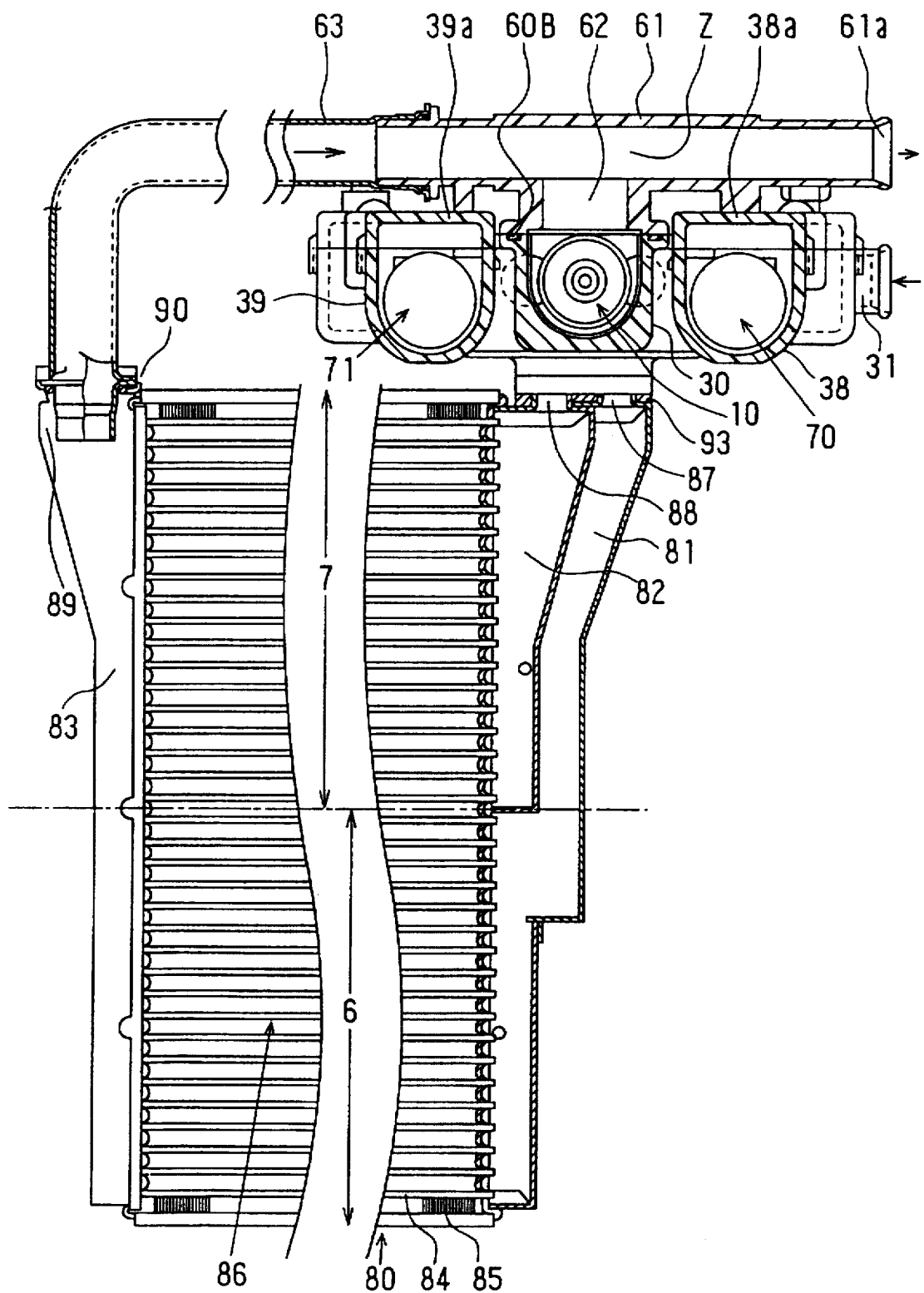
FIG. 5 is a partial broken front view of the integrated flow control valves and heater core portions, and a cross-sectional view taken along line V—V in FIG. 4.
Figure 6:
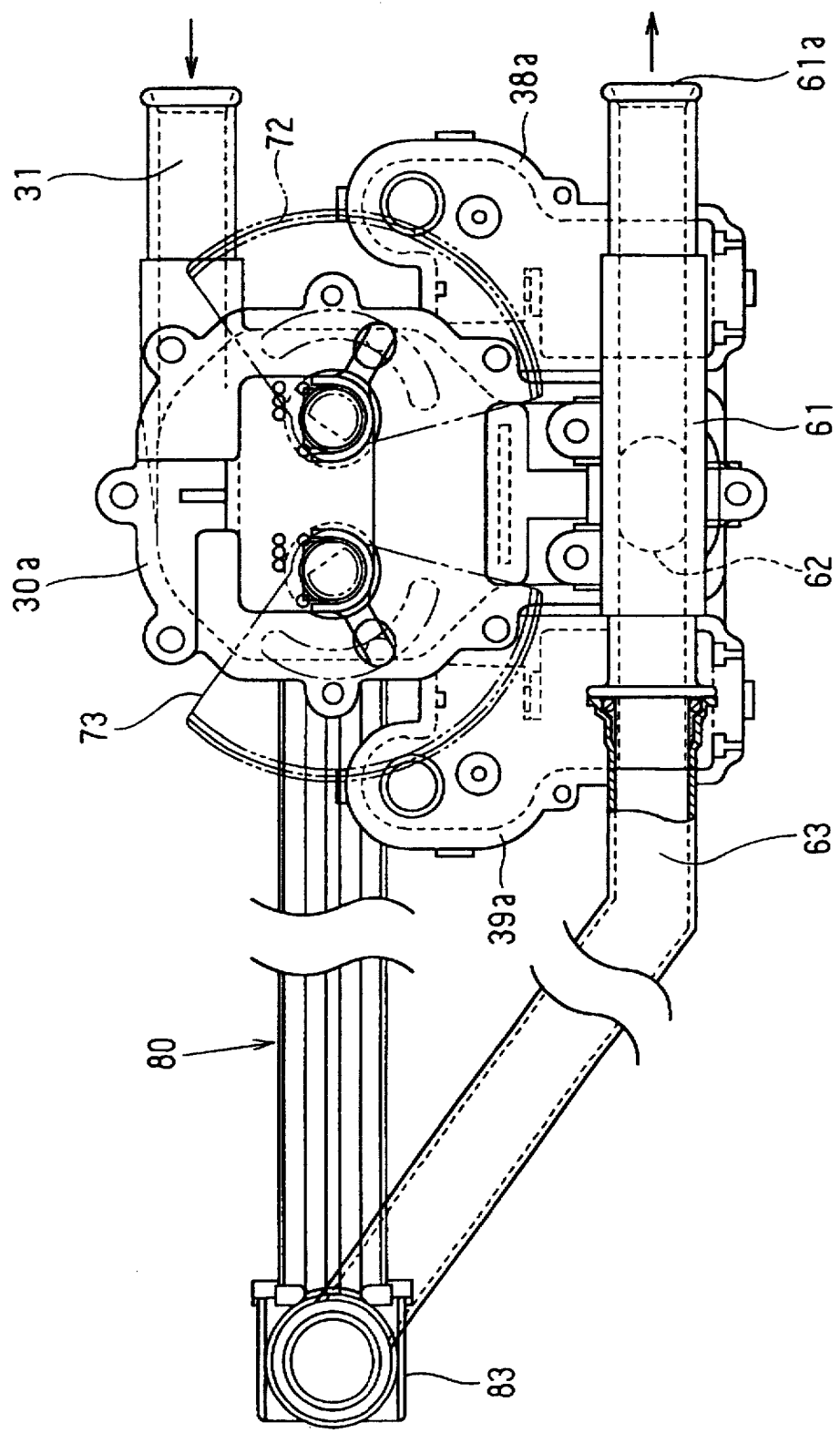
FIG. 6 is a partly broken plan view showing an integrated state of the flow control valves and the heater core portions of the first embodiment when the upper cover of the flow control valve is attached.

FIG. 3 is an exploded perspective view showing a main portion of the first and second flow control valves 4 and 5, FIGS. 4 through 6 show integrated structures of the first and second flow control valves 4 and 5 and the first and second heater core portions 6 and 7. Valve bodies 44 and 54 of the flow control valves 4 and 5 are made of resin and respectively formed in cylindrical shapes, and are disposed in parallel to be rotatably within a resin housing 30.

In the first embodiment, each of the valve bodies 44 and 54 is formed by a rotatable cylindrical rotor, and each axis of the cylindrical valve bodies 44 and 54 extends in a direction perpendicular to the paper in FIG. 4 (i.e., an up-and-down direction in FIG. 5).

A hot-water inlet pipe 31 made of resin, into which hot-water flows from the engine 1, is formed integrally with the housing 30. A hot-water inlet chamber 32 (refer to FIG. 4) into which hot-water flows from the inlet pipe 31 is formed within the housing 30, and is branched to two passages, that is, the first passage 3a and the second passage 3b shown in FIG. 1.

The first passage 3a and the second passage 3b are disposed to be opposite to the outer peripheral surfaces of the cylindrical valve bodies 44 and 45, respectively, hot-water inlet side elastic seal members 33 and 34 composed of rubber packing are disposed between the first and second passages 3a and 3b and the cylindrical valve bodies 44 and 54, respectively. As shown in FIG. 3, the rubber seal members 33 and 34 each have rectangular shapes, circular hot-water flow holes 33a and 34a are respectively formed at center portions of the seal members 33 and 34.

The first restriction portions 41 and 51 shown in FIG. 1 are formed by the hot-water flow holes 33a and 34a of the elastic seal members 33 and 34 and hot-water inlet side opening portions 45 and 55 (refer to FIG. 3) opened on the outer peripheries of the cylindrical valve bodies 44 and 54.

A partition plate 35 made of resin is disposed between the two valve bodies 44 and 54 disposed in parallel, and hot-water paths of the two valve bodies 44 and 54 are separated by the partition plate 35. On the outer peripheral surfaces of the cylindrical valve bodies 44 and 54, bypass side elastic seal members 36 and 37 are disposed at symmetrical positions with 180° relative to the hot-water inlet side rubber seal members 33 and 34, respectively.

Each of the elastic seal members 36 and 37 is composed of rubber packing, and has a rectangular shape as shown in FIG. 3. Round-shaped hot-water flow holes 36a and 37a are formed respectively at center portions of the seal members 36 and 37. By the hot-water flow holes 36a and 37a of the bypass side elastic seal members 36 and 37, the bypass openings 43 and 53 shown in FIG. 1 are formed. As shown in FIG. 4, the two hot-water flow holes 36a and 37a are communicated with the bypass passage 9 formed in the housing 30. The bypass passage 9 is a common passage relative to the two flow control valves 4 and 5.

A constant-differential pressure valve 10 is disposed in the bypass passage 9. The constant-differential pressure valve 10 includes a valve body 10a made of resin and having a substantially circular plate shape. A guide shaft 10b is slidably inserted into a center portion of the valve body 10a in the up-and-down direction in FIG. 4. Each one end of coil springs 10c (spring means) contacts with the valve body 10a to press the valve body 10a in an upper direction of FIG. 4 (valve-opened direction). An O-ring (i.e., elastic seal member) 10d disposed on outer surface of the valve body 10a is press-contacted with a valve seat 10e so that the constant-differential pressure valve 10 becomes in a closing valve state.

A center hole of the valve seat 10e is formed in a taper shape in which the hot-water inlet side thereof expands to decrease water resistance. Another end portions of the coil springs 10c are supported by a supporting plate 10f made of resin, and the supporting plate 10f is fitted to the inner surface of the housing 30 by spring force. Further, the guide shaft 10b is formed integrally with the supporting plate 10f at the center portion of the supporting plate 10f.

When a differential pressure before and after the valve body 10a, i.e., a difference of the pressure, between an inlet side of the valve seat 10e and a downstream side of the valve body 10a, reaches a predetermined value, the valve body 10a moves to the lower side in FIG. 4 while resisting the spring force of the coil spring 10c so that the valve body 10a is lifted from the valve seat 10e to be opened. Further, also when the engine 1 is in idling (i.e., when the rotational speed of the engine is the lowest), in a case where the necessary flow amount of the hot-water is sufficiently obtained to secure the maximum heating capacity, it is also acceptable to provide a plurality of through-holes (bypass holes, not shown) in the valve body 10a so that hot-water flows through the holes when the valve is closed.

FIG. 4 shows a state in which upper cover portions 30a, 38a and 39a of the housing 30 and housings 38 and 39 (refer to FIG. 6) are taken out. An elastic seal member 60A composed of an O-ring is placed between the housing 30 and the upper cover portion 30a (refer to FIG. 7), and the upper cover portion 30a is firmly water-tightly connected to the housing 30 by fastening means such as screws while compressing and deforming the elastic seal member 60A.

On the other hand, within the housings 38 and 39, there are accommodated electric driving devices 70 and 71 for operating respectively the valve bodies 44 and 54 of the first and second flow control valves 4 and 5. Although the housings 38 and 39 are formed integrally with the housing 30, these housings 38 and 39 are separated from the hot-water circuit portion formed in the housing 30. Therefore, the upper cover portions 38a and 39a are connected integrally to the housing members 38 and 39 by fastening means such as screws, without using the elastic seal member therebetween.

A hot-water outlet pipe 61 made of resin is disposed at a position opposite to the constant-differential pressure valve 10 in the housing 30, and extends up to the upper portions of the electric driving devices 70 and 71 adjacently disposed at left and right sides of the constant-differential pressure valve 10 in FIG. 4. Similarly to the upper cover portion 30a, an elastic seal member 60B (refer to FIG. 5) composed of an O-ring is placed between the hot-water outlet pipe 61 and the housing 30, and the hot-water outlet pipe 61 is water-tightly connected integrally to the housing 30 by fastening means such as screws to seal therebetween. As a result, the hot-water circuit portion in the housing 30 is sealed by the upper cover portions and the hot-water outlet pipe 61.

A downstream end 61a of the hot-water outlet pipe 61 is connected to an intake side of the water pump 2 in the hot-water circuit of FIG. 1. An opening portion 62 is formed in the hot-water outlet pipe 61, and is communicated with the constant-differential pressure valve 10 at a downstream side of the valve body 10a. Further, an upstream end 61b of the hot-water outlet pipe 61 is connected to a connecting pipe 63 from a hot-water outlet 89 (refer to FIG. 5) of the first and second heater core portions 6 and 7. Thus, the position of the opening portion 62 corresponds a joined portion Z of the hot-water circuit shown in FIG. 1.

The hot-water outlet pipe 61 and the connecting pipe 63 are detachably and water-tightly connected with a joint (not shown) using an elastic seal member such as an O-ring. The connecting pipe 63 is made of metal such as aluminum or a rigid body such as resin.

Figure 7:
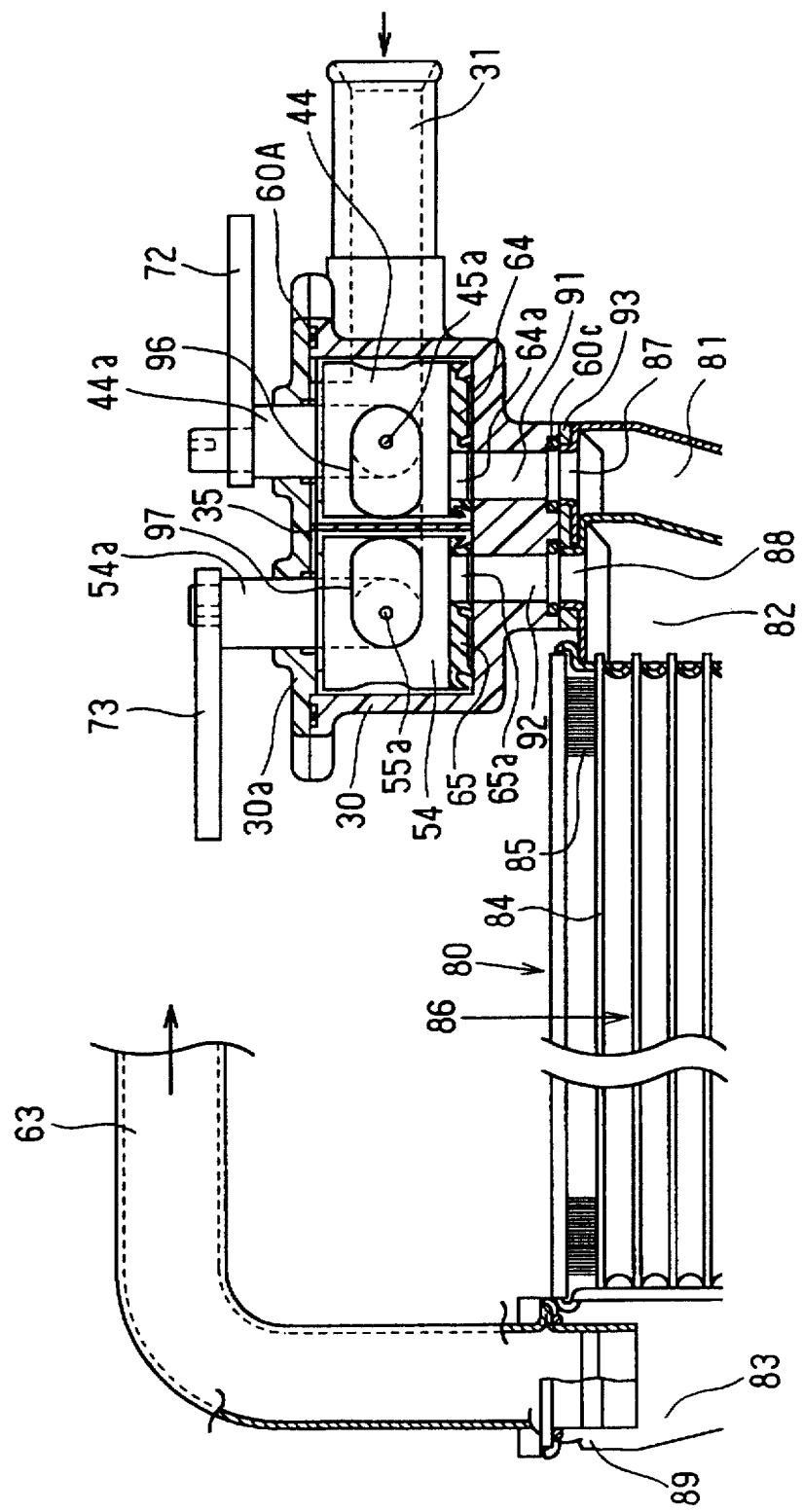
FIG. 7 is a partial enlarged view showing the integrated flow control valves and heater core portions, in which center portions of the valve bodies in FIG. 4 are shown with cross-sections.

As shown in FIGS. 3 and 7, elastic seal members 64 and 65 at the inlet sides of the heater core portions are disposed respectively at one end side of the cylindrical valve bodies 44 and 54 of the first and second flow control valves 4 and 5 in the axial direction of the valve bodies 44 and 54. Each of the elastic seal members 64 and 65 is composed of rubber packing, and formed in an elliptical shape. Hot-water flow holes 64a and 65a having the elliptical shapes are formed respectively at positions biased with a little distance from the center portions of the seal members 64 and 65 to end sides.

The hot-water flow holes 64a and 65a are formed to communicate with outlet side opening portions 98 and 99 (refer to FIGS. 10A–10I) opened respectively on the end surfaces of the cylindrical valve bodies 44 and 54 at one end side of the axial direction of the valve bodies 44 and 54.

The hot-water flow holes 64a and 65a of the elastic seal members 64 and 65 always communicate with hot-water outlet holes 91 and 92 opened on the bottom portions of the housing 30. The hot-water outlet holes 91 and 92 are directly connected to hot-water inlets 87 and 88 of the first and second heater core portions 6 and 7 as described later.

Next, a driving operation mechanism of the first and second flow control valves 4 and 5 are will be described.

At the other end surfaces (upper end surface in FIG. 3) of the cylindrical valve bodies 44 and 54 in the axial direction, shafts 44a and 54a for rotating the valve bodies 44 and 54 are formed integrally with the valve bodies 44 and 54. The shafts 44a and 54a protrude to outer surface side (i.e., upper side) of the upper cover 30a of the housing 30.

Each of protruding ends of the shafts 44a and 54a has a D-shaped cross-section. Fan-shaped gears 72 and 73 are disposed at the outer surface side of the upper cover 30a of the housing 30, the D-shaped protruding ends of the shafts 44a and 54a are respectively inserted into rotation center holes (i.e., holes formed at pivot portions of the fan-shaped gears 72 and 73) of the fan-shaped gears 72 and 73 so that the fan-shaped gears 72 and 73 and the shafts 44a and 53a are respectively connected integrally. Thus, the shaft 44a and the fan-shaped gear 72, and the shaft 54a and the fan-shaped gear 73 are respectively integrally rotated.

The electric driving devices 70 and 71 located adjacently at the left and right sides of the constant-differential pressure valve 10 have respectively servomotors 70a and 71a composed of direct current motors, and worm gears 74 and 75 are respectively disposed at top end portions of shafts 70b and 71b of the servomotors 70a and 71a. The worm gears 74 and 75 are engaged with a group of flat gears 76 and 77 for deceleration, respectively, and the last step gears of the group of flat gears 76 and 77 for deceleration are engaged with outer peripheral gears of the fan-shaped gears 72 and 73.

In the above-described mechanism, the rotations of the servomotors 70a and 71a are respectively independently transmitted to the cylindrical valve bodies 44 and 54, so that each of the valve bodies 44 and 54 is independently rotated. That is, by the above-described mechanism, the valve body operating means for independently rotating each of the valve bodies 44 and 54 are constructed. Herein, as the valve body operation devices, the electric driving devices 70 and 71 having actuator such as the servomotors 70a and 71a are used in this embodiment; however, the valve bodies 44 and 54 may be operated by a manual operation mechanism employing levers, wires, and the like.

When the manual operation mechanism is used, pins are integrally molded on the upper surfaces of the resin-made fan-shaped gears 72 and 73, and wires for manual operation may be connected to the pins, respectively.

Next, structures of the first and second heater core portions 6 and 7 are specifically described with reference to FIGS. 4 through 7.

In the first embodiment, the first and second heater core portions 6 and 7 are integrally formed within a heater core (i.e., a heating heat exchanger) 80. The heater core 80 is a heat exchanger having a plurality of aluminum plates connected integrally by brazing.

The heater core 80 has first and second tanks 81 and 82 separated from each other at the hot-water inlet end side and a common tank 83 formed at the hot-water outlet end side.

Between the left and right tanks 81, 82 and 83, a core portion 86 composed of a plurality of flat tubes 84 and corrugate fins 85 disposed in parallel is formed. The core portion 86 is a heat exchange portion for performing heat exchange between hot-water and air. The heater core 80 is structured as an unidirectional flow type in which hot-water flows in only one direction from the inlet-side tanks 81 and 82 to the outlet-side tank 83.

As shown in FIG. 5, hot-water from the inlet-side tanks 81 and 82 respectively independently flows through the upper half portion and the lower half portion of the core portion 86, so that the first and second heater core portions 6 and 7 are formed.

First and second hot-water inlets 87 and 88 and a hot-water outlet 89 are respectively formed at each one end side of the tank 81 through 83 in the longitudinal direction (i.e., upper end side in FIG. 5). One end of the connecting pipe 63 is water-tightly and detachably connected to the hot-water outlet 89 at a joint 90 using a seal member such as an O-ring.

A fitting plate 93 made of metal such as aluminum is bonded around the hot-water inlets 87 and 88 of the inlet-side tanks 81 and 82 by brazing, the bottom of the housing 30 of the flow control valves 4 and 6 is placed on the fitting plate 93. An elastic seal member 60C composed of an O-ring is placed between the bottom of the housing 30 and the fitting plate 93, and the bottom of the housing 30 is water-tightly connected by fastening means such screws while compressing and deforming the elastic seal member 60C.

As described above, in the first embodiment, the bypass passage 9, the constant-differential pressure valve 10, and the electric driving devices 70 and 71 composed of the servomotors 70a and 71a and the like are formed integrally with the flow control valves 4 and 5, and further, the integrated parts are previously connected to the heater core 80. Thus, the parts of the hot-water type heating apparatus can be assembled in the air duct 11 (i.e., a heater case) as an integrated structure, the assembling performance is improved, and the heater core portion can be downsized.

Further, in the first embodiment, there are various devices to simplify the work for connecting the hot-water pipes when the air conditioning apparatus is installed in a vehicle. As shown in FIGS. 5 and 6, the hot-water inlet pipe 31 into which hot-water flows from the engine 1 and the hot-water outlet pipe 61 through which the hot-water returns to the engine 1 are disposed in parallel and protrude in the same direction.

Specifically, the hot-water outlet pipe 61 is disposed perpendicularly to a direction extending along the longitudinal direction of the outlet-side tank 83 of the heater core 80, and the hot-water inlet pipe 31 is disposed perpendicularly to a direction extending along the longitudinal direction of the inlet-side tanks 81 and 82 of the heater core 80 and in parallel with the hot-water outlet pipe 61.

The cylindrical valve bodies 44 and 54 respectively have opening patterns for control passages for regulating opening areas A1 of the first restriction portions 41 and 51 (i.e., hot-water inlet opening area from engine 1), opening areas A2 of the second restriction portions 42 and 52 (i.e., the inlet opening area of the heater core), and opening areas A3 of the bypass openings 43 and 53. Hereinafter, the opening patten will be described specifically.

Figure 8:
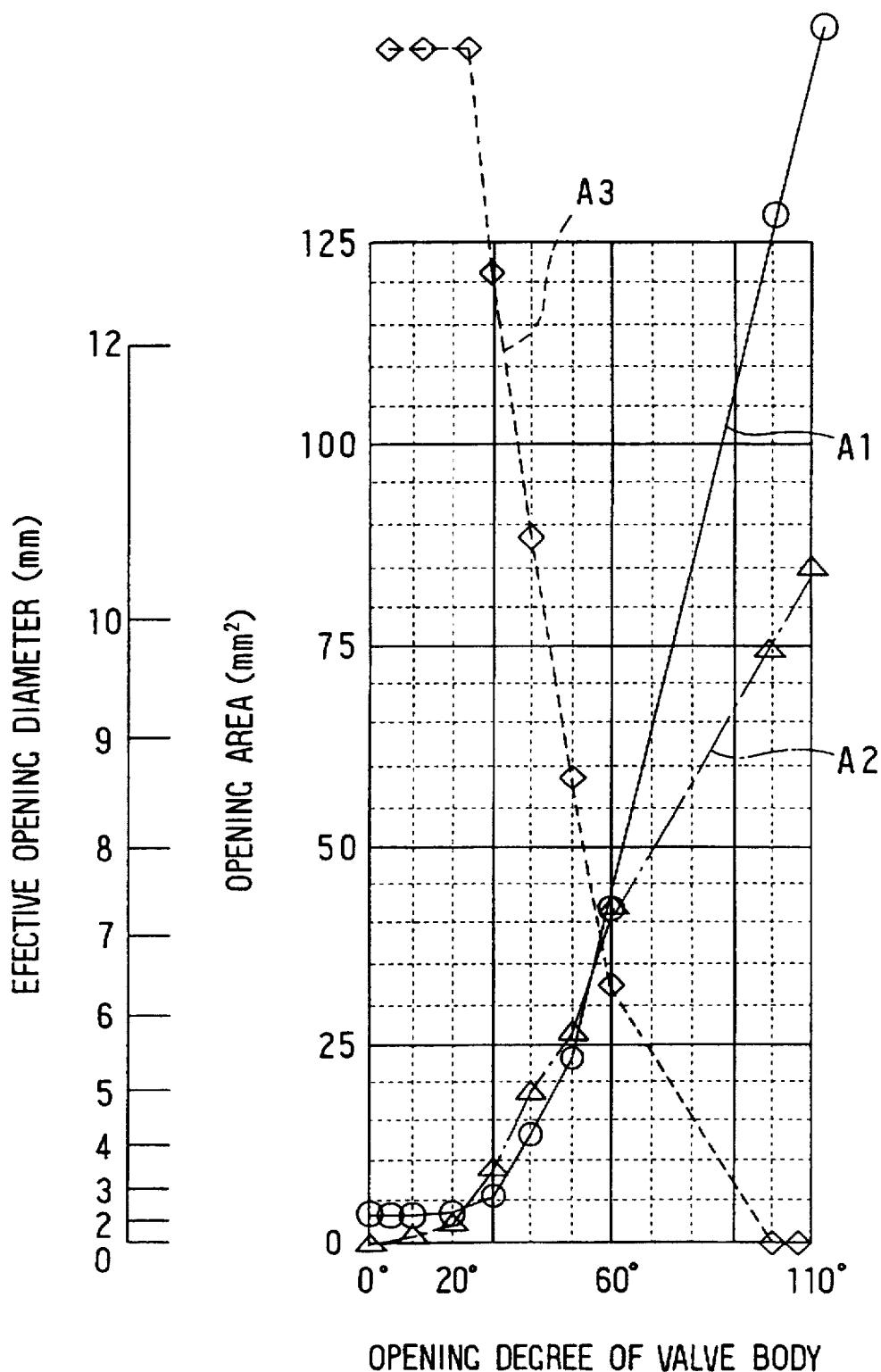
FIG. 8 is a graph showing characteristics of the valve bodies of the flow control valves according to the first embodiment.
Figure 9:
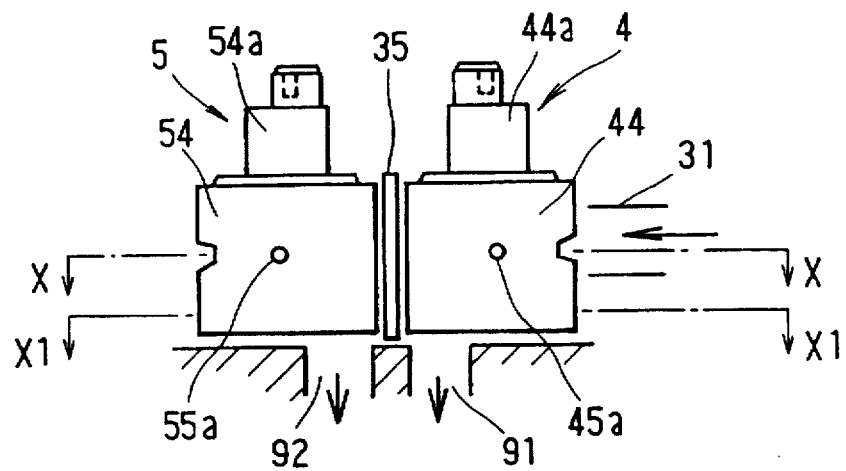
FIG. 9 is a front view showing the valve bodies of first and second flow control valves.

In the first embodiment, according to each opening degree (i.e., rotation angle of the valve body) of the valve bodies 44 and 54, the opening areas A1, A2 and A3 are controlled by each opening patten of the valve bodies 44 and 54 to have a predetermined relationship shown in FIG. 8.

To realize the relationship shown in FIG. 8, the opening patten of the valve bodies 44 and 54, and shapes of the hot-water flow holes 33a and 34a of the elastic seal members 33 and 34 at the hot-water inlet side, the hot-water flow holes 36a and 37a of the elastic seal members 36 and 37 at the bypass side and the hot-water flow holes 64a and 65a of the elastic seal members 64 and 65 at the heater core inlet side, in which the valve bodies 44 and 54 slide, are respectively set as shown in FIGS. 10A–10I and FIGS. 11A–11I.

FIGS. 10A–10I are cross-sectional views and development diagrams. The cross-sectional views in FIGS. 10A–10I show the outlet-side opening portions 98 and 99 formed on the end surfaces of the valve bodies 44 and 54 in the shaft direction and the hot-water flow holes 64a and 65a of the elastic seal members 64 and 65 at the heater core inlet side. The development diagrams in FIGS. 10A–10I show the development shapes of peripheral surfaces of the valve bodies 44 and 54. Further, FIGS. 11A–11I are cross-sectional views taken along line XI—XI in FIG. 9 to show the opening patten and the changes of communicating state between the hot-water flow holes 33a, 34a, 36a, 37, 64a and 65a when each opening degree of the valve bodies 44 and 54 is changed at nine steps from 0° through 110°.

When the opening degree of each valve body is 0°, the heating apparatus is in the maximum cooling operation (i.e., a non-heating operation) in which hot-water does not flow to the first and second heater core portions 6 and 7. When the opening degree of each valve body is 110°, the heating apparatus is in a maximum heating operation in which hot-water flowing to the first and second heater core portions 6 and 7 is made maximum.

On the peripheral surfaces of the valve bodies 44 and 54, inlet side opening portions 45, 55, 45a and 55a and bypass side opening portions 96 and 97 are formed. The inlet side opening portions 45, 55, 45a and 55a and the bypass side opening portions 96 and 97 regulate the opening area A1 of the hot-water inlets and the opening area A3 of the bypass openings 43 and 53.

The mechanism for regulating the opening area A1 of hot-water inlet and the opening area A3 of the bypass opening will be specifically described.

When the opening degree of the valve body is changed, the communicating state between the inlet side opening portions 44, 55, 45a and 55a and the round-shaped hot-water flow holes 33a and 34a of the seal members 33 and 34 is changed. The inlet side opening portions 44 and 54 have bill-shaped top end portions, and are communicated with the hot-water flow holes 33a and 34 from the bill-shaped top end portions when the opening degree of the valve body is more than 20°.

The inlet side opening portions 45a and 55a are round-shaped small holes having a diameter of 2 mm, so that the inlet-side opening portions 45a and 55a communicate with the hot-water flow holes 33a and 34a even if the opening degree of the valve body is 0°. However, when the opening degree of the valve body is more than 40°, the inlet side opening portions 45a and 55a and the hot-water flow holes 33a and 34a are not communicated with each other.

Further, each of the bypass side opening portions 96 and 97 has an elliptical shape, and each of the hot-water flow holes 36a and 37a of the seal members 36 and 37 connected to the bypass side opening portions 96 and 97 has a round shape.

On each one end surface of the valve bodies 44 and 54 in the axial direction, outlet side opening portions 98 and 99 are formed, respectively. By the outlet side opening portions 98 and 99, the opening area A2 of the heater core inlet is regulated. The regulation mechanism of the opening area A2 of the heater core inlet will be specifically described. By the opening area A2, the communicating state between the outlet side opening portions 98 and 99 and the hot-water flow holes 64a and 65a of the seal members 64 and 65 can be changed. The hot-water flow holes 64a and 65a have elliptical shape and are biased from the rotation centers of the valve bodies 44 and 54 so as not pass the rotation centers of the valve bodies 44 and 54.

On the other hand, in the non-heating operation (i.e., the opening degree of the valve body is 0°), the outlet side opening portions 98 and 99 of the valve bodies 44 and 54 are disposed at positions opposite to the hot-water flow holes 64a and 65a with 180° relative to the rotation centers of the valve bodies 44 and 5 to have beak-shaped top end portions.

When the heating apparatus is in a small capacity heating operation (e.g., the opening degree of the valve body is less than 40°), small opening portions 98a and 99a communicating with the hot-water flow holes 64a and 65a are formed at the top end portions of the outlet side opening portions 98 and 99.

Within the valve body 44, the above-described opening portions 45, 45a, 96 and 98 are always communicated with each other. Similarly, within the valve body 54, the above-described opening portions 55, 55a, 97 and 99 are always communicated with each other.

When the opening degree of the valve body is 40°, the slant line portions shown in FIG. 10E are the overlapped portions between each opening portion and each hot-water flow hole, that is, the hot-water flowing portions. The sizes of the slant line portions define the opening areas A1, A2 and A3.

As described above, by the inlet side opening portions 45, 55, 45a and 55a of the valve bodies 44 and 55 and the hot-water flow holes 33a and 34a of the seal members 33 and 34, each opening area A1 of the first restriction portions 41 and 51 of the hot-water inlet side is regulated. By the outlet side opening portions 98 and 99 of the valve bodies 44 and 54 and the hot-water flow holes 64a and 65a of the seal members 64 and 65, each opening area A2 of the second restriction portions 42 and 52 of the hot-water outlet side is regulated. Further, by the bypass side opening portions 96 and 97 of the valve bodies 44 and 54 and the hot-water flow holes 36a and 37a of the seal members 36 and 37, each opening area A3 of the bypass openings 43 and 53 is regulated.

Next, the operation of the first embodiment will be described.

When the heating apparatus is in the maximum heating operation, the valve bodies 44 and 54 of the flow control valves 4 and 5 are rotated to the maximum opening degree by the servomotors 70a and 71a (i.e., the opening degree of the valve body is 110°, as shown in FIGS. 10I and 11I). Therefore, the inlet side opening portions 45 and 55 of the control passages in the valve bodies 44 and 54 overlap with the hot-water flow holes 33a and 34a of the seal members 33 and 34, respectively, with the maximum area, and the outlet side opening portions 98 and 99 overlap with and the hot-water flow holes 64a and 65a of the hot-water outlet side seal members 64 and 65, respectively, with the maximum area. That is, each of the opening areas A1 and A2 becomes the largest (refer to FIG. 8). When the opening degree of the valve body is 110° in FIG. 10I, portions of the outlet side opening portions 98 and 99, which do not overlap with the hot-water flow holes 64a and 65a, respectively, maintain the communicating state between the outlet side opening portions 98 and 99 and the inlet side opening portions 45 and 55, respectively.

On the other hand, when the opening degree of the valve body is 110°, the bypass side opening portions 96 and 97 of the control passages of the valve bodies 44 and 54 are not communicated with the hot-water flow holes 36a and 37a of the bypass side seal members 36 and 37, respectively. Therefore, the bypass openings 43 and 53 are entirely closed.

As a result, hot-water flowing from the engine 1 flows through the first and second heater core portions 6 and 7 of the heater core 80 in the maximum capacity, and does not flow into the bypass passage 9. Thus, the first and second heater core portions 6 and 7 operate with the maximum heating capacity. At this time, the hot-water inlet pipe 31 is communicated with the hot-water inlets 87 and 88 of the first and second heater core portions 6 and 7, respectively, with the maximum opening areas A1 and A2. Therefore, there is no possibility that the passage is choked up by the extraneous materials such as casting grain, noise of the flow is generated due to sudden restriction in the flow.

Additionally, by fully closing the bypass passage 9 as described above, an amount of the flow circulating into a radiator for cooling the engine 1 can be secured.

Next, when the heating operation is stopped (i.e., it is in the maximum cooling operation when the air-conditioning apparatus for a vehicle is equipped with a cooling function), the valve bodies 44 and 54 of the flow control valves 4 and 5 are rotated respectively by the servomotors 70a and 71a to positions of zero opening degree as shown in FIGS. 10A and 11A. At this positions of zero opening degree, the bypass side opening portions 96 and 97 of the control passages in the valve bodies 44 and 54 overlap with the hot-water flow holes 36a and 27a of the bypass-side seal members 36 and 37, respectively, with the maximum area, so that the bypass side opening area A3 is maximized.

Further, the outlet side opening portions 98 and 99 of the valve bodies 44 and 54 are not communicated with the hot-water flow holes 64a and 65a of the hot-water outlet side seal members 64 and 65, respectively, so that the opening area A2 of the hot-water outlet side becomes zero.

On the other hand, as shown in the development diagram in FIG. 10A, only the inlet side opening portions 45a and 55a overlap and communicate with the hot-water flow holes 33a and 34a of the hot-water inlet-side seal members 33 and 34, respectively. As the opening area A1 of the hot-water inlet side, the minimum opening area corresponding to a round-shaped hole having a diameter of 2.0 mm is set by the inlet-side opening portions 45a and 55a without fully closing the passage from the hot-water inlet pipe 31.

Thus, it is possible to maintain hot-water flowing from the hot-water inlet pipe 31 to the bypass openings 43 and 53. As a result, noise of water hammer phenomenon by rapid stop of flowing hot-water is prevented, and noise of flowing water is also prevented from being caused by setting the minimum opening area corresponding to a round shaped hole having a diameter which is equal to or more than 2.0 mm. Casting grain existing in hot-water circuit are generally minute materials, diameter of which are not more than 1.0 mm. Therefore, it is possible to sufficiently prevent extraneous materials such as casting grain from choking up the passage of the flow control valve by setting the size of the minimum opening area.

Further, a flow of water circulating into a radiator (not shown) for the engine 1 can be secured by setting the opening area of the hot-water inlet pipe 31 to the minimum opening area corresponding to a round shaped hole having a diameter of 2.0 mm.

Next, when the heating apparatus is in the small capacity operation, each of the valve bodies 44 and 54 is rotated to the valve opening degree of 20° or less, and therefore, the inlet side opening portions 45a and 55a and the small opening portions 98a and 99a of the outlet side opening portions 98 and 99 are overlapped respectively with the hole portions 33a, 34a, 64a and 65a of the hot-water inlet side and the hot-water outlet side with a small opening area. Thus, both opening areas A1 and A2 of the hot-water inlet side and the hot-water outlet side are restricted (double restriction state), and the intermediate portion between the first and second restriction portions 42 and 52 forming two steps restriction communicates with the bypass passage 9 with a sufficient large opening area A3 by the bypass openings 43 and 53 which are in full opening position, so that pressure in the intermediate portion is reduced.

As a result, differential pressure between the front and the back of each heater core portion 6 and 7 is made sufficiently small, and variation in hot-water flow amount (which finally corresponds to a variation in temperature of air blown to the passenger compartment) according to the valve opening degree can be eased without providing a specific small opening area. That is, control gain of blown-air temperature can be reduced.

By reducing the control gain, it is possible to control the temperature of air blown to the passenger compartment accurately, and it is also possible to sufficiently prevent extraneous materials such as casting grain from choking up the fluid passage of the flow control valve, because it is not necessary to set opening areas A1 and A2 of the hot-water inlet side and hot-water outlet side to a specific small opening area.

Further, by setting the opening area A1 in the restriction portion of the hot-water inlet side to twice as much as the opening area A2 in the restriction portion of the hot-water outlet side (i.e., the area shown in the graph in FIG. 8 when the valve body opening degree is less than 20°), it is possible to increase the flow of hot-water bypassing from the hot-water inlet pipe 31 to the bypass openings 43 and 53 so that extraneous material such as casting grain may flow to the bypass openings 43 and 53 readily. In this way, extraneous material staying in the second restriction portions 42 and 52 of the hot-water outlet side is washed away by the bypassing flow. Thus, it is possible more effectively to prevent extraneous material such as casting grain from choking up the passage of the flow control valve.

Next, when the heating apparatus is in an intermediate capacity operation, each of the valve bodies 44 and 54 is rotated in a rotation range corresponding to the valve body opening degrees of 20°-60° shown in FIG. 8. In the valve body rotation range, the opening area A1 of the hot-water inlet side restriction portion and the opening area A2 of the hot-water outlet side restriction portion are increased in the same degree, and the bypass side opening area A3 is gradually decreased. Thus, an amount of hot-water flowing to the first and second heater core portions 6 and 7 are increased to increase the temperature of the blown-air gradually.

Even if the valve bodies 44 and 54 are in such rotation position, it is possible to reduce the control gain and control the temperature of air blown into the passenger compartment by the double restriction (i.e., two steps restriction) accurately. Further, because the opening area of the restriction portion is increased, there is no possibility that extraneous material such as casting gain will choke-up the fluid passage. Therefore, in this state, the opening area A1 of the hot-water inlet side restriction portion is set to substantially same as the opening area A2 of the hot-water outlet side restriction portion.

Next, when the heating apparatus is in a state between the intermediate capacity operation and a large capacity operation, each of the valve bodies 44 and 54 is rotated to the extent of valve opening greater than 60° and less than 110° so that the both opening areas A1 and A2 are further increased and the bypass side opening area A3 is further decreased. Thus, an amount of hot-water flowing to the first and second heater core portions 6 and 7 is further increased to increase blown-air temperature.

Pressure of the hot-water supplied from the engine 1 varies greatly in accordance with the changes of the running condition of the vehicle, because the rotational speed of the engine 1 which supplies hot-water to the air conditioning apparatus for the vehicle varies greatly in accordance with the running condition of the vehicle. It may have a great influence on hot-water flow control by the flow control valve 4 and finally on temperature control of the blown-air. However, in the first embodiment, the variation in the amount of the hot-water flow due to the variation in the pressure of the hot-water supplied from the engine 1 is satisfactorily overcome by providing the constant-differential pressure valve 10 in the bypass passage 9.

That is, when the pressure of hot-water supplied from the engine 1 rises so that the differential pressure between the front and the back of the valve body 6a becomes higher than a predetermined pressure determined by the spring 6b, the valve body 10a moves toward the downward direction in FIG. 4 to be opened. The clearance between the valve body 10a and the valve seat 10e is controlled in accordance with the differential pressure so that the constant-differential pressure valve 6 maintains the differential pressure between the front side and the back side of the constant-differential pressure valve 10 to a constant value.

Therefore, the pressure of hot-water acting on the first and second heater core portions 6 and 7 can be maintained at a constant value in spite of the variation in the pressure of the hot-water supplied from the engine 1, and the variation in the amount of the hot-water due to the variation in the pressure of the hot-water supplied from the engine 1 can be prevented.

Figure 2:
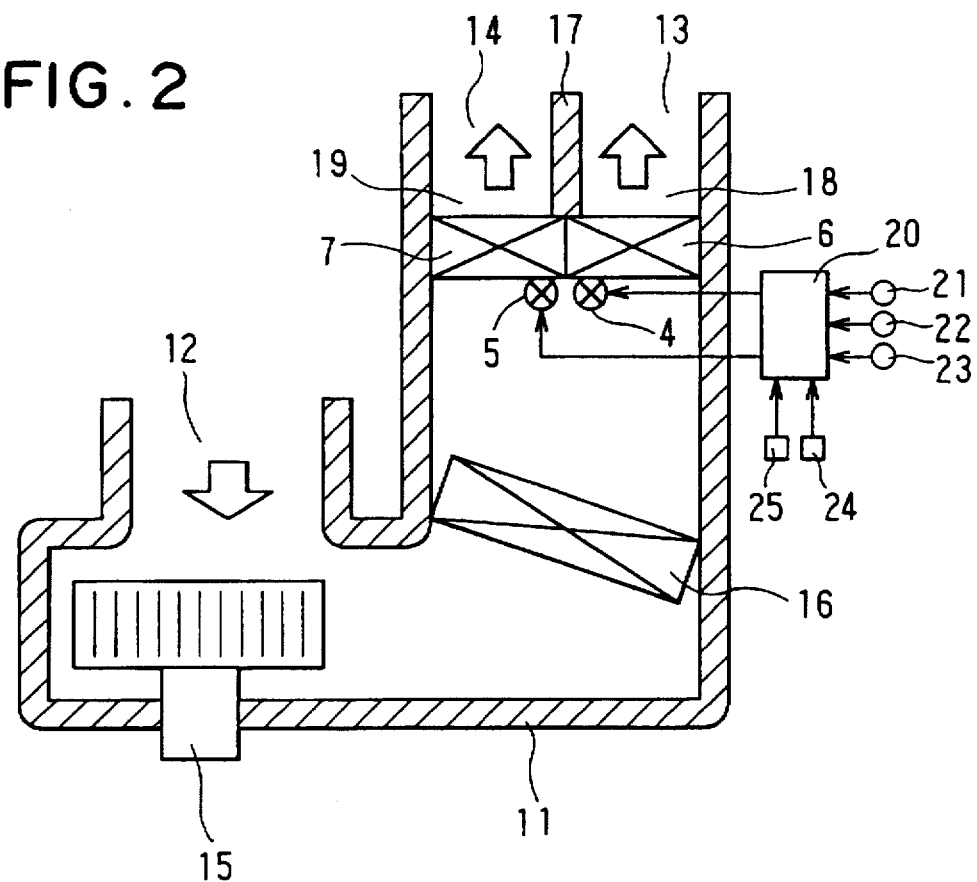
FIG. 2 is a cross-sectional view showing positions of heater core portions disposed within an air conditioning duct according to the first embodiment.

In the above-described operation, the valve opening degrees of the first and second flow control valve 4 and 5 are controlled in the same opening degree; however, each valve opening degree of the first and second flow control valves 4 and 5 can be automatically controlled independently by the ECU 20 as shown in FIG. 2.

That is, the signals detected by the sensors 21, 22 and 23 and the temperature setting signals detected by the temperature setting device 24 for driver's seat and the temperature setting device 25 for the passenger's seat are input to the ECU 20. Thus, the ECU 20 performs a predetermined process, and outputs control signals of valve opening degree to the servomotors 70a and 71a for driving the first and second flow control valves 4 and 5, respectively, so that each valve opening degree of the first and second flow control valves 4 and 5 is automatically controlled independently.

Thus, each amount of hot-water flowing into the first and second heater core portions 6 and 7 is controlled independently, and each amount of air heated by the first and second heater core portions 6 and 7 can be controlled. As a result, the temperature of air blown toward the space at the driver's seat side and the temperature of air blown toward the space at the passenger's seat side in the passenger compartment can be controlled independently.

The present invention is not limited to the above-described first embodiment, various type of embodiments or modifications will be described as below.

A second embodiment of the present invention will be described.

Figure 12:
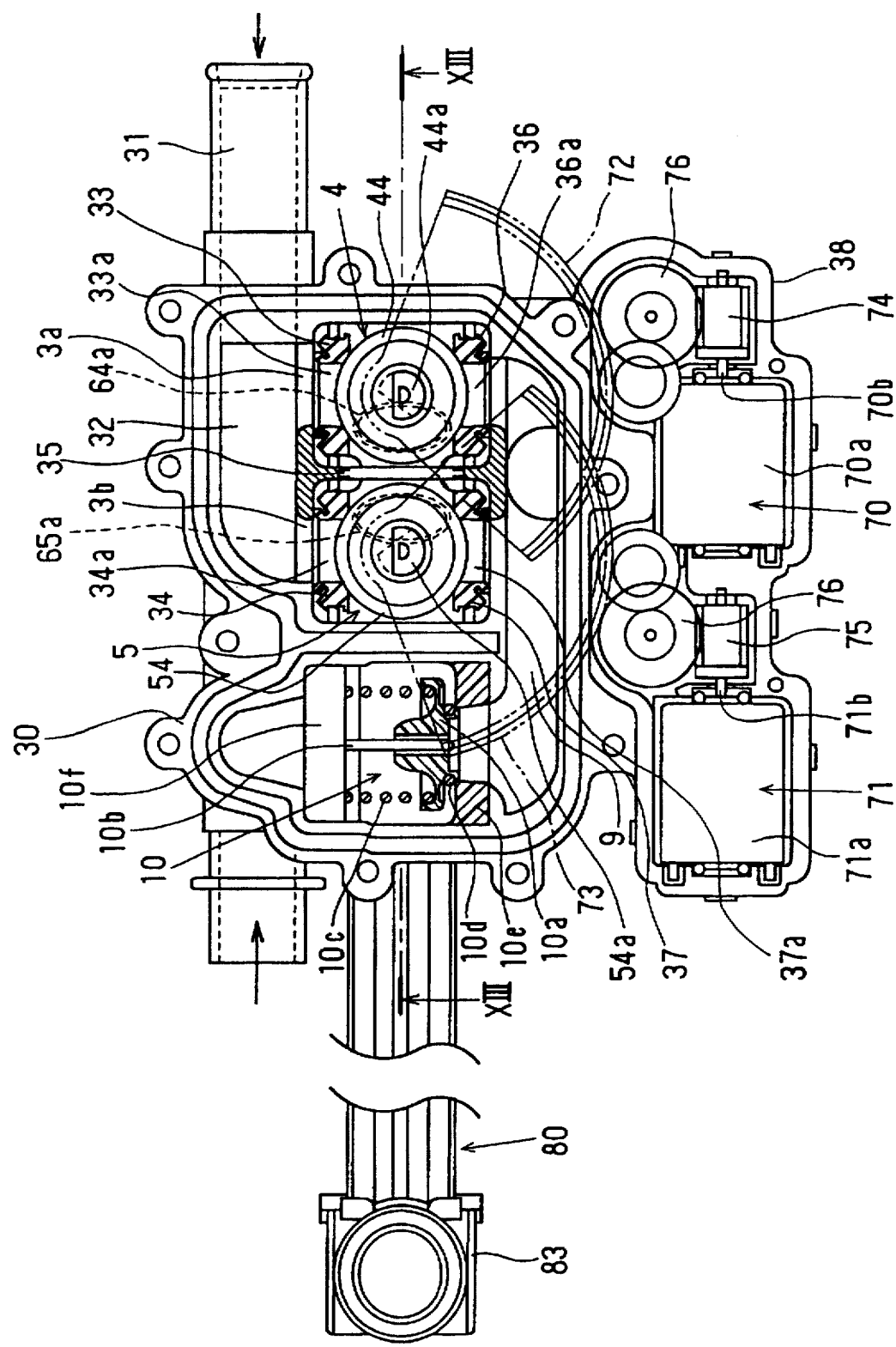
FIG. 12 is a partial cross-sectional plan view showing an integrated flow control valves and the heater core portions according to second embodiment when an upper cover of the flow control valves is taken out.
Figure 13:
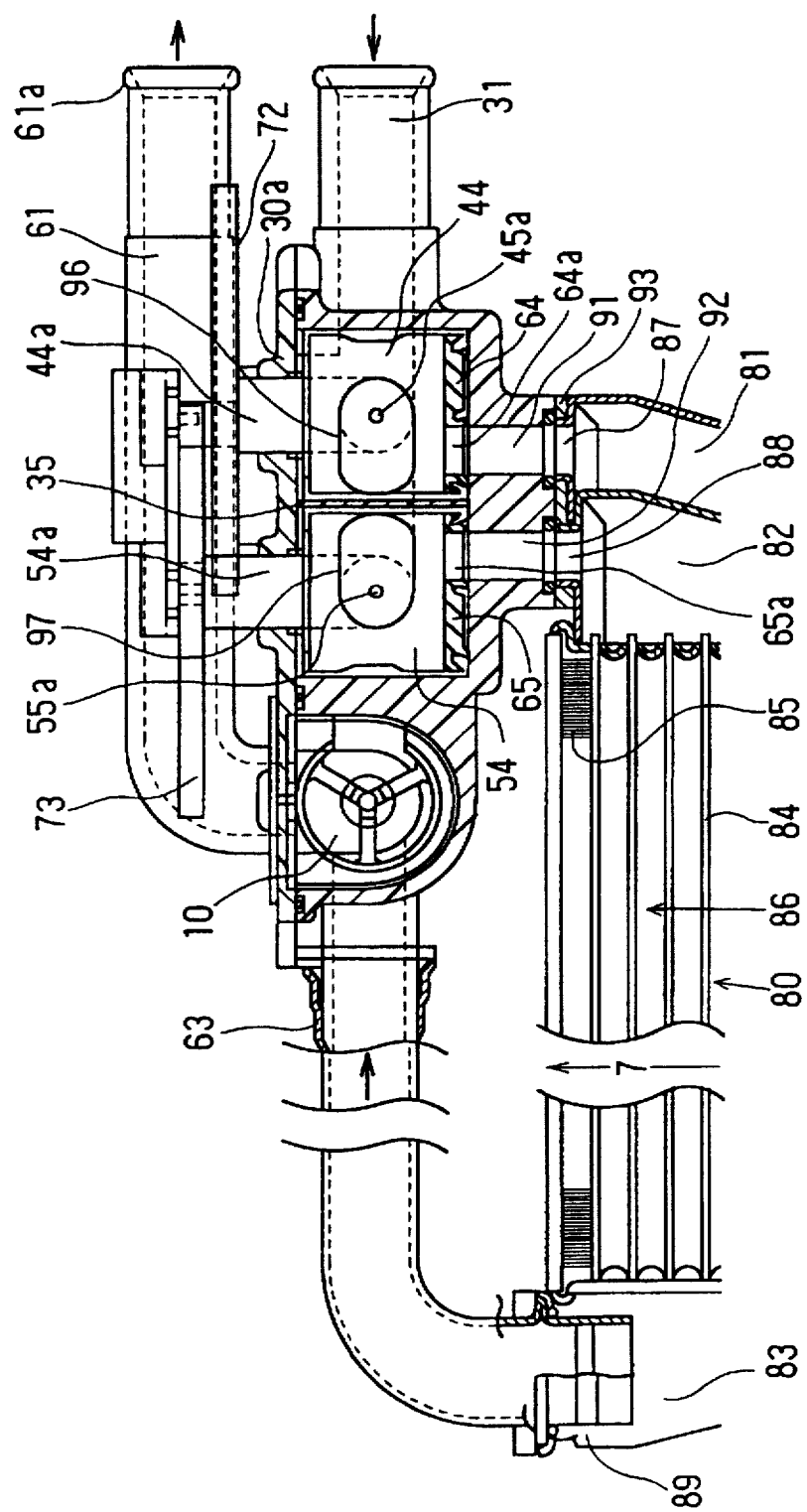
FIG. 13 is a partly enlarged cross-sectional view taken along line XIII—XIII in FIG. 12.

In the second embodiment, as shown in FIGS. 12 and 13, the installation positions of the constant-differential pressure valve 10 and the electric driving devices 70 and 71 for driving the valve bodies 44 and 54 of the first and second flow control valves 4 and 5 are changed as compared with the first embodiment, and the other points are similar to the first embodiment.

In the first embodiment, the guide shaft 10b of the constant-differential pressure valve 10 is disposed on the same plane with the partition plate 35 between the first and second flow control valves 4 and 5, and the electric driving devices 70 and 71 are disposed adjacently at the right and left two sides of the constant-differential pressure valve 10 so that the flow control device having the two flow control valves 4 and 5 is symmetrically disposed as shown in FIG. 4. In the second embodiment, as shown in FIG. 12, the constant-differential pressure valve 10 is disposed at a side position of the first and second flow control valve 4 and 5 in parallel, and the electric driving devices 70 and 71 are directly disposed adjacent to each other.

Thus, in the second embodiment, the two electric driving devices 70 and 71 can be accommodated in a common housing 38, and therefore, one housing for accommodating the electric driving device can be reduced as compared with the first embodiment.

In the second embodiment, because the constant-differential pressure valve 10 is disposed at the side position of the first and second flow control valves 4 and 5 in parallel, dynamic pressure of hot-water passing through the hot-water flow holes 36a and 37a of the bypass-side seal members 36 and 37 is not directly applied to the valve body 10a of the constant-differential pressure valve 10. Therefore, the opening degree of the valve body 10a of the constant-differential pressure valve 10 is decreased in accordance with the dynamic pressure, and an absorption effect of the variation in hot-water flow due to the variation in hot-water supply pressure can be decreased.

A third embodiment of the present invention will be described.

In the first and the second embodiments, as for the first and the second flow control valves 4 and 5, the single bypass passage 9 and the single constant-differential pressure valve 10 are commonly employed to simplify the structure of the heating apparatus. However, in the third embodiment, the bypass passage 9 and the constant-differential pressure valve 10 may be independently disposed for each of the first and second flow control valves 4 and 5, so that the absorption effect of the variation in the amount of the hot-water due to the variation in the hot-water supply pressure may be further increased.

Figure 14:
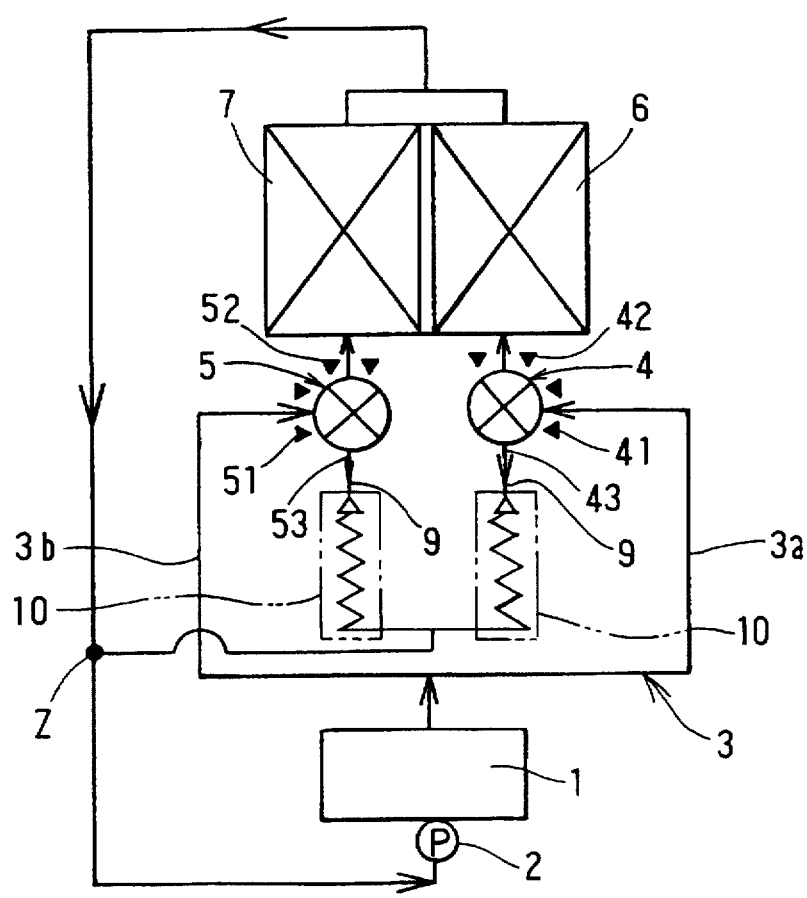
FIG. 14 is a hot-water circuit diagram showing a third embodiment of the present invention.

FIG. 14 shows a hot-water circuit according to the third embodiment. As shown in FIG. 14, the bypass passages 9 and the constant-differential pressure valves 10 are independently disposed relative to each of the first and second flow control valves 4 and 5.

Figure 15:
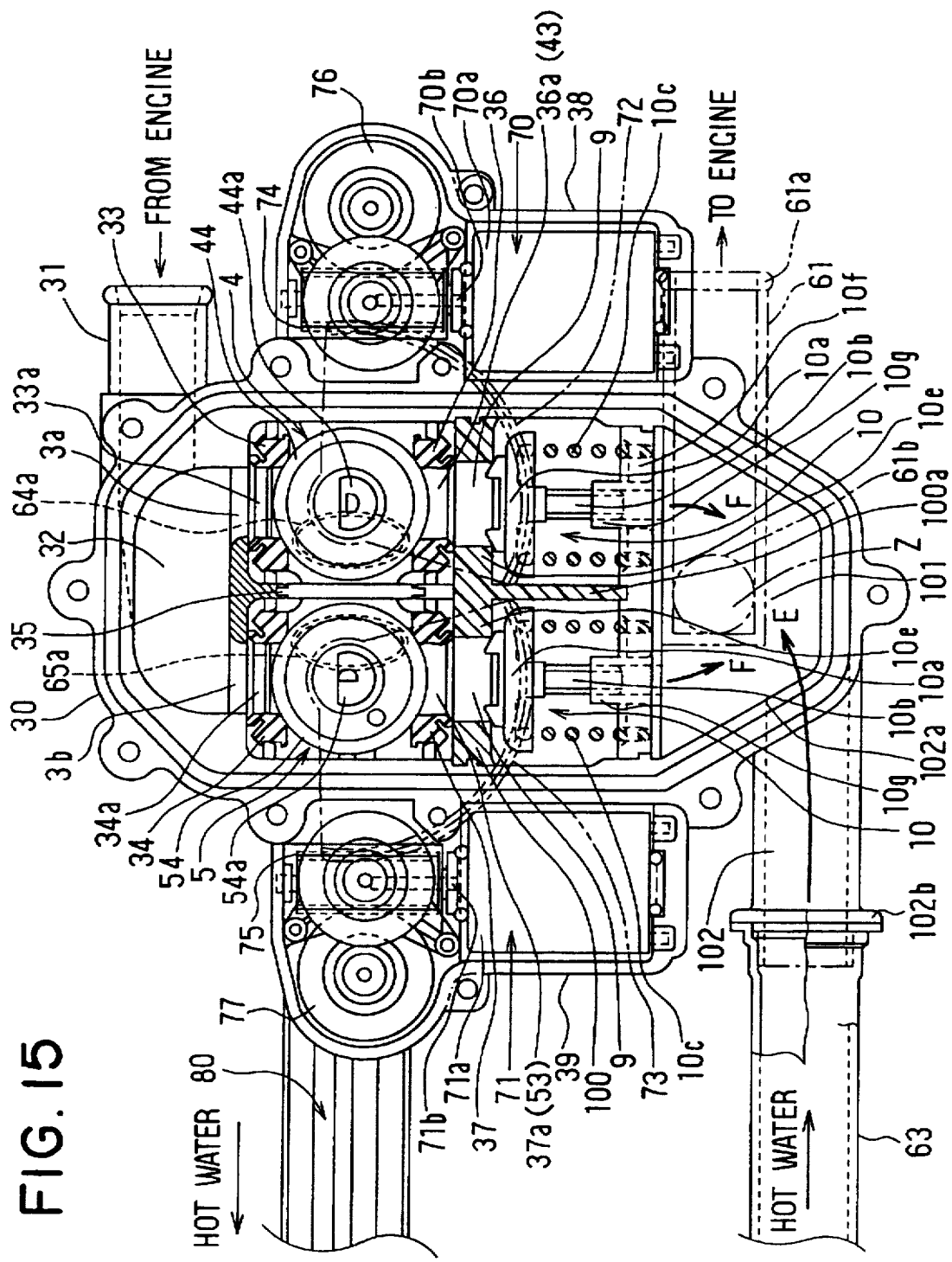
FIG. 15 is a partial cross-sectional plan view showing an integrated flow control valves and heater core portions according to the third embodiment when the upper cover of the flow control valve is taken out.

FIGS. 15 and 16 show a heating apparatus according the third embodiment. The heating apparatus includes two by-pass passages 9 and two constant-differential pressure valves 10. The parts similar or equivalent to the first and second embodiments have the same reference numerals and the descriptions thereof are omitted. Only features of the third embodiment will be described below.

Within the housing 30, a partition plate 100 made of resin is disposed at a downstream side of the seal members 36 and 37 in the hot-water flow direction, and bypass passages 9 communicating respectively with the hot-water flow holes 36a and 37a of the seal members 36 and 37 are formed in the partition plate 100 in parallel. Further, the constant-differential pressure valves 10 for independently controlling each opening degree of the bypass passages 9 are disposed at a downstream side of the bypass passages, respectively.

Further, in the partition plate 100, valve seats 10e on which the valve bodies 10a of constant-differential pressure valves 10 are seated, respectively, are formed, and a partition plate for separating hot-water passage of the two constant-differential pressure valves 10 is formed integrally with the partition plate 100.

In each of the constant-differential pressure valves 10 according to the third embodiment, a guide shaft 10b is formed integrally with the valve body 10a, and the guide shaft 10b is fitted slidably in cylindrical portions 10g formed on the supporting plate 10f of coil springs 10c. Thus, the valve body 10a can move (be lifted) in the up-and-down direction with the fitted portion as a guide portion.

The supporting plate 10f has a shape shown in FIG. 17A, each of cylindrical portions 10g placed at the center portions of the coil springs 10c is connected to the body of the supporting plate 10f through three arm portions 10i. By the arm portions 10i, each one end of the coil springs 10c is supported. Thus, hot-water passes smoothly through spaces 10h between the arm portions 10i almost without causing pressure loss.

Within the housing 30, a hot-water join chamber 101 is formed at a downstream side of the supporting plate 10f in the hot-water flow direction. Hot-water passing through the spaces between the arm portions 10i of the supporting plate 10f flows into the hot-water joining chamber 101 as shown by arrows F in FIG. 15.

On the other hand, at the outer peripheral side of the housing 30, a hot-water inlet pipe 102 is formed integrally with the housing 30, one end 102a of the pipe 102 is opened in the hot-water joining chamber 101. The other end 102b of the pipe 102 is connected to the end portion of the connecting pipe 63 of the hot-water outlet 89 of the first and second heater core portions 6 and 7 (refer to FIG. 5). Thus, hot-water flowing from the heater core passes through the connecting pipe 63 and the hot-water inlet pipe 102 and flows into the hot-water joining chamber 101 as show by the arrow in FIG. 15. Further, hot-water flowing from the bypass passages 9 passes through the spaces between the arm portions 10i of the supporting plate 10f and flows into the hot-water joining chamber 101 as show by the arrows F in FIG. 15.

In FIG. 16, the both constant-differential pressure valves 10 are not shown; however, the both constant-differential pressure valves 10 are disposed at a position having a height similar to that of the hot-water inlet pipe 102 in the up-and-down direction in FIG. 16. Therefore, hot-water flowing from the bypass passages 9 and hot-water flowing from the heater cores are joined together perpendicularly substantially on a same surface. That is, the hot-water joining chamber 101 corresponds to the join portion Z in FIG. 14.

As shown in FIG. 16, a hot-water outlet pipe 61 is formed integrally with the resin upper cover 30a of the housing 30 at an upper position of the hot-water joining chamber 101. The pipe 61 and the hot-water inlet pipe 31 are disposed in parallel, and an upstream end 61b of the pipe 61 is bent at a right angle and is opened at a center portion of the hot-water joining chamber 101 (refer to FIG. 15).

In the third embodiment, because both bypass passages 9, both constant-differential pressure valves 10 and the hot-water circuits are independently formed, the absorption effect of the variation in the temperature of the blown-air due to the variation in the engine rotational speed can be improved.

In the first and second embodiments in which the bypass passage 9 and the constant-differential pressure valve 10 are commonly employed for the first and second flow control valves 4 and 5, when the valve bodies 44 and 54 of the flow control valves 4 and 5 are set to have different opening degrees from each other, for example, when the opening degree of the right side valve body 44 is set at 40° and the opening degree of the left side valve body 54 is set at 20°, the flow speed of bypass hot-water passing through the left side valve body 54 becomes larger than that of bypass hot-water passing through the right valve body 44.

Therefore, when the engine 1 rotates with a high rotational speed (e.g., the rotational speed is more than 4000 r.p.m.), the opening degree (i.e., the lifted amount) of the valve body 10a of the constant-differential pressure valves 10 becomes larger by the dynamic pressure of bypass hot-water passing through the left side valve body 44. As a result, the opening degree of the valve body 10a of the constant-differential pressure valves 10 becomes large excessively when viewed from the right side flow control valve 4 having 40° opening degree, the amount of the hot-water flowing through the first heater core portion 6 controlled by the right side flow control valve 4 are excessively decreased as compared with the bypass hot-water, so that there is a problem that the temperature of air blown from the first heater core portion 6 becomes lower than a target temperature.

Figure 18:
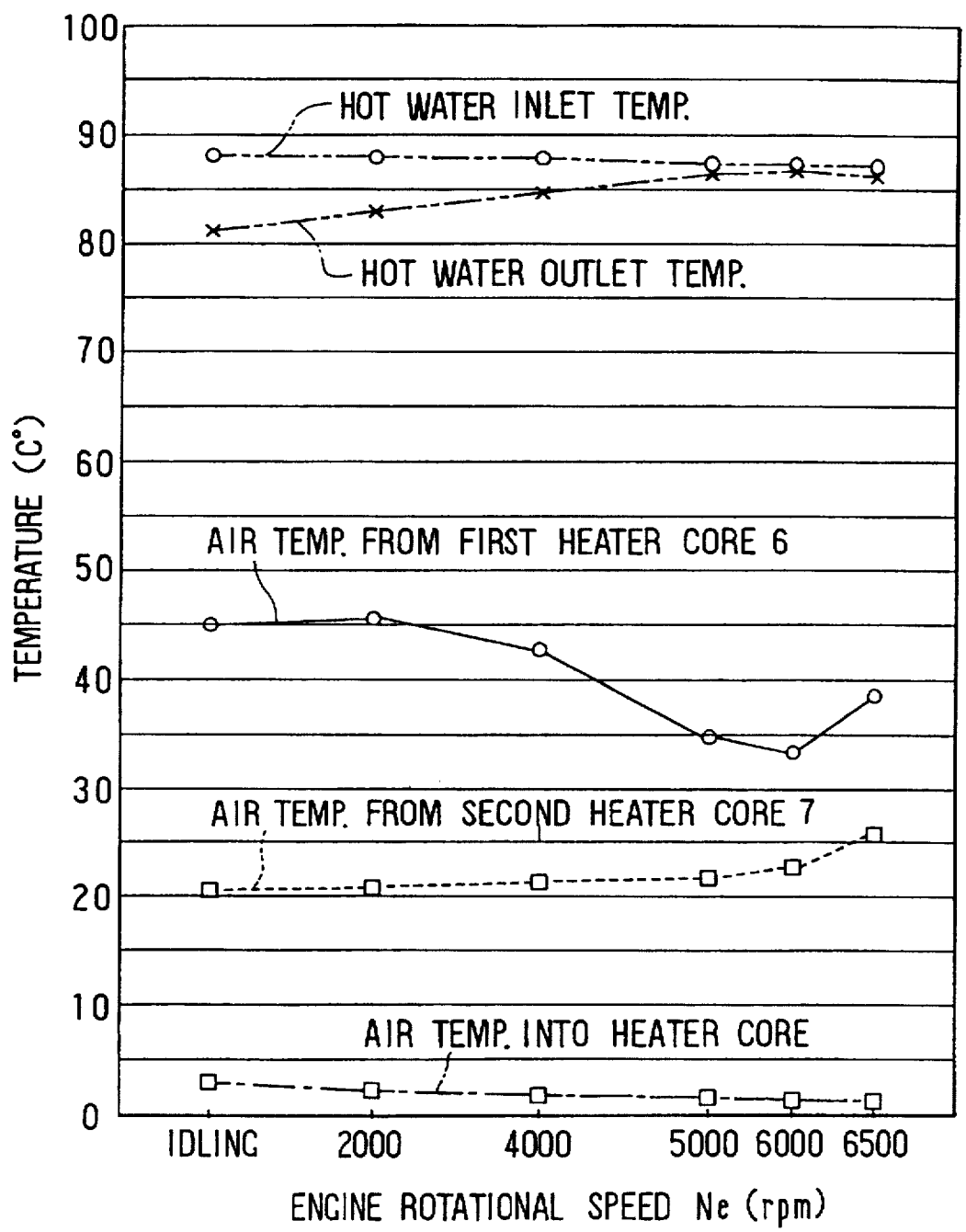
FIG. 18 is a graph showing control characteristics of blown-air temperature when a bypass passage and the constant-difference pressure valve are commonly employed according to the first and second embodiment.

FIG. 18 shows control characteristics of blown-air temperature when the single bypass passage 9 and the single constant-differential pressure valve 10 are commonly employed according to the first and second embodiment. When the opening degree of the right side valve body 44 is 40° and the opening degree of the left side valve body 54 is 20°, the temperature of air blown from the first heater core portions 6 is changed by the variation in the engine rotational speed Ne, and the largest temperature variation is about 15° C. in the first heat core 6.

In the third embodiment, even if the opening degrees of the valve bodies 44 and 54 of the flow control valve 4 and 5 are set at different opening degrees from each other, bypass hot-water flowing from the hot-water flow holes 36a and 37a (i.e., the bypass openings 43 and 53) of the seal members 36 and 37 is separated by the partition portion 100a for each constant-differential pressure valve 10, and therefore, the dynamic pressures of bypass hot-water flowing from the hot-water flow holes 36a and 37a are applied to the both valve bodies 10a of the right and left constant-differential pressure valves 10, respectively.

As a result, each opening degree of the valve bodies 10a of the constant-differential pressure valves 10 can be set suitably according to the engine rotation speed and the opening degrees of the valve bodies 44 and 54 of the flow control valves 4 and 5, and the absorption effect of the variation in blown-air temperature due to the variation in the engine rotational speed can be improved.

Figure 19:
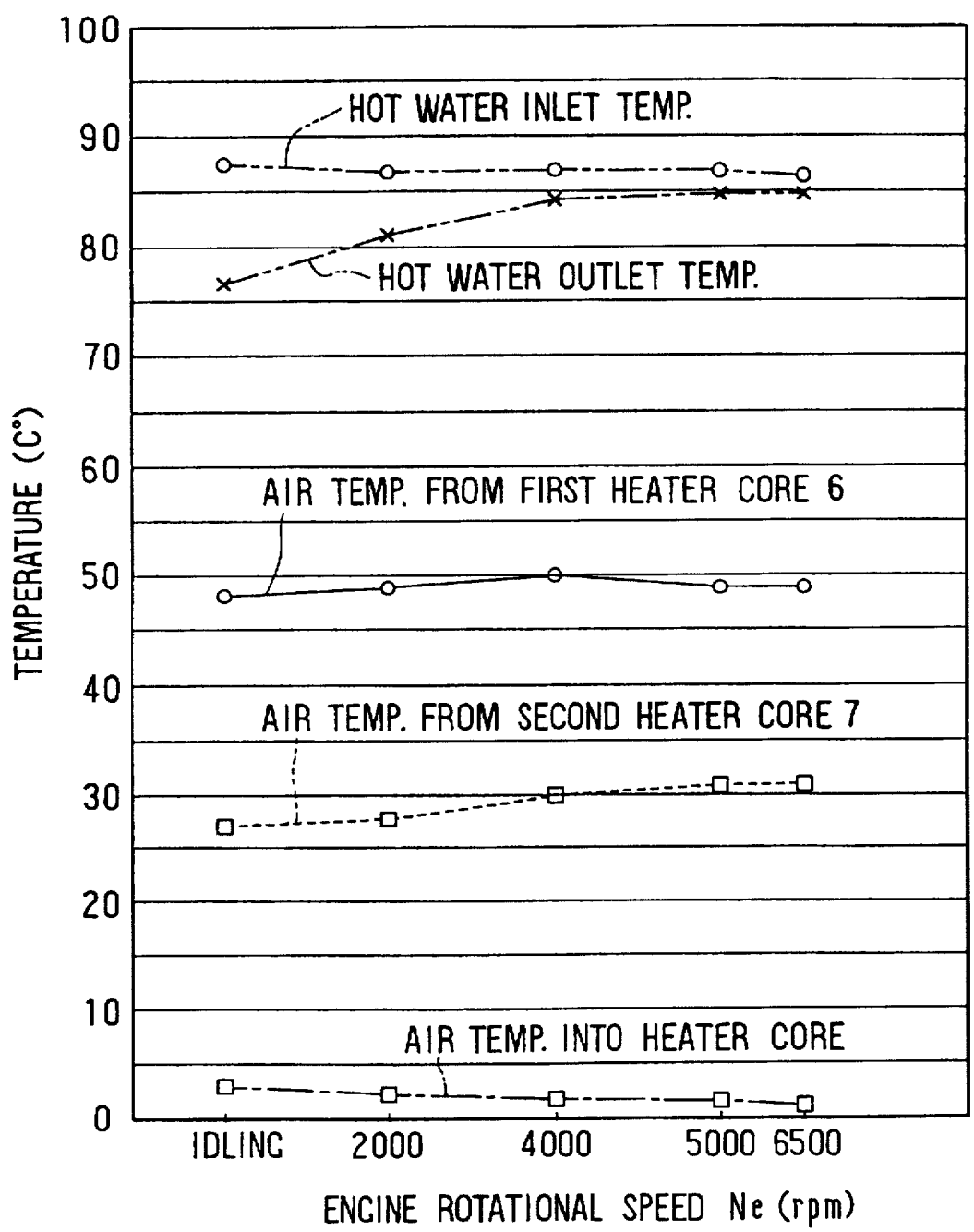
FIG. 19 is a graph showing control characteristics of blow-air temperature according to the third embodiment.

FIG. 19 shows the absorption effect of the variation in blown-air temperature. When the opening degree of the right side valve body 44 is 40° and the opening degree of the left side valve body 54 is 20°, each variation in the temperature of air blown from the first heater core portions 6 can be suppressed within a minute value in which the variation in the temperature of air blown from the right side first heater core portions 6 relative to the variation in the engine rotational speed Ne is within 4.0° C. and the variation in the temperature of air blown from the left side second heater core portion 7 is within 1.0° C.

Pressure of hot-water supplied from engine 1 varies greatly in accordance with the running condition of a vehicle, because the rotational speed of the engine 1 which supplies hot-water to the air conditioning apparatus for a vehicle varies greatly in accordance with the running condition of the vehicle (i.e., the rotational speed of engine 1 varies from 750 r.p.m. in idling to 6000 r.p.m. in a high rotation. Therefore, by only the constant-differential pressure valves 10 disposed in a limited space and having greatly restricted shape, the variation in the temperature of the blown-air due to the largest variation in hot-water supply pressure cannot be sufficiently decreased.

In the third embodiment, the variation in the flow of hot-water flowing in the heating heat exchanger 3 due to the variation in pressure of the hot-water supplied from the engine 1 is overcome favorably by the both constant-differential pressure valves 10 and the method where the hot-water joins in the constant-differential pressure valves 10.

That is, hot-water flowing from the first and second heater core portions 6 and 7 flows into the hot-water joining chamber 100 as shown by the arrow E in FIG. 15, bypass hot-water flowing from the both bypass passages 9 flows into the hot-water joining chamber 101 as shown by the arrows F in FIG. 15, and the hot-water returned from the first and second heater core portions 6 and 7 are joined with the bypass hot-water by a substantially right angle.

Thus, the flow of bypass hot-water interferes with the flow of hot-water returned from the heater core portions 6 and 7 to dam the flow of hot-water returned from the heater core portions 6 and 7. As a result, by the damming operation of bypass side hot-water, hot-water flowing from the heater core portions 6 and 7 can be effectively suppressed in a high engine rotational speed, and therefore, the increase of the temperature of the blown-air of the heating heat exchanger 3 can be suppressed within a minute value in the high engine rotational speed.

In the third embodiment, because the join portion Z in which bypass side hot-water passing through the valve bodies 10a of the constant-differential pressure valves 10 is joined with hot-water returned from the heater core portions 6 and 7 is disposed adjacent to the valve bodies 10a of the constant-differential pressure valves 10, the bypass side hot-water can perpendicularly interfere with the hot-water returned from the heater core portions 6 and 7 before decreasing the dynamic pressure of bypass side hot-water. The bypass side hot-water passes through small clearance portions of the valve bodies 10a so that dynamic pressure of bypass side hot-water becomes high. Thus, the dynamic pressure of bypass side hot-water can be effectively applied to hot-water returned from the heater core portions 6 and 7 to increase the damming operation.

The damming operation in the hot-water join portion Z can be provided similarly in the hot-water join portion Z according to the first and second embodiments.

In the above-described embodiments, by the first and second flow control valves 4 and 5 and the first and second heater core portions 6 and 7, the temperature of air blown toward a space at the driver's seat side and the temperature of air blown toward a space at the passenger's seat in a passenger compartment are independently controlled. However, the present invention may be employed when the upper side temperature and the lower side temperature in a passenger compartment or the front seat side temperature and the rear seat side temperature in a passenger compartment are independently controlled.

Further, the present invention can be employed in a hot-water type heating apparatus for a house, for example.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A flow control device for controlling a flow of hot-water supplied from a hot-water supply source to a plurality of heating heat exchange portions, said flow control device comprising:
   a plurality of flow control valves corresponding to said heating heat exchange portions, respectively,
   each of said flow control valves including:
   first restriction means for forming a first restriction portion in an inlet for receiving hot water from said hot water supply source,
   second restriction means for forming a second restriction portion in an outlet for introducing hot water to said respective heating heat exchange portions,
   bypass opening means for forming a bypass opening opened at an intermediate pressure portion between said first restriction portion and said second restriction portion,
   a valve body for controlling each opening area of said first restriction portion, said second restriction portion, and said bypass opening, and
   a first housing for accommodating said first restriction means, said second restriction means, said bypass opening means, and said valve body; and
   valve body driving means for independently driving each of said valve bodies;
   wherein said first housing is commonly employed for said plurality of flow control valves and includes therein a bypass passage communicating with said bypass opening and bypassing said plurality of heating heat exchange portions.

2. A flow control device according to claim 1, wherein said bypass passage is commonly employed for said plurality of bypass openings.

3. A flow control device according to claim 1, further comprising:
   a pressure valve disposed in said bypass passage, said pressure valve being constructed and arranged to open when pressure of hot-water supplied from said hot-water supply source increases.

4. A flow control device according to claim 1, wherein said bypass passage includes a plurality of bypass passages, each of which independently communicates with said bypass openings of said flow control valves.

5. A flow control device according to claim 4, further comprising:
   a plurality of pressure valves disposed respectively in said plurality of bypass passages, each of said pressure valves being constructed and arranged to open when pressure of hot-water supplied from said hot-water supply source increases.

6. A flow control device according to claim 1, further comprising:
   means for forming a joining portion in which hot-water flowing from said pressure valve and hot-water flowing from said heating heat exchange portions join together to dam a flow of hot-water returned from said heating heat exchange by a flow of hot-water flowing from said pressure valve.

7. A flow control device according to claim 6, wherein said pressure valve and said heating heat exchange portions are arranged such that the flow of hot-water returned from said heating heat exchange portions perpendicularly joins with the flow of hot-water flowing from said pressure valve.

8. A flow control device according to claim 6, further comprising:
   means for forming a hot-water joining chamber for forming said joining portion, said hot-water joining chamber being disposed at a direct downstream side of said pressure valve in said first housing.

9. A flow control device according to claim 1, wherein, said valve body driving means includes electric driving devices for independently driving each of said valve bodies of said plurality of flow control valves, and
   each of said electric driving devices is accommodated in a second housing integrated with said first housing.

10. A flow control device according to claim 1, wherein each of said electric driving devices includes a servomotor and a gear mechanism which transfers rotation of said servomotor to each of said valve bodies.

11. A flow control device according to claim 1, wherein, said valve bodies of said flow control valves are constructed by cylindrical rotors disposed rotatably in said first housing in parallel,
   said valve bodies are rotated to regulate each opening area of said first restriction portion, second restriction portion, and said bypass openings,
   each of said second restriction portions is formed at a biased position toward a center between said plurality of cylindrical valve bodies,
   each of said valve bodies includes a hot-water outlet formed at a biased position toward a center between said plurality of cylindrical valve bodies and communicating with said second restriction portion, and
   said hot-water outlets of said valve bodies are connected to hot-water inlets of said heating heat exchange portions, respectively.

12. A hot-water type heating apparatus for a vehicle having a water-cooled engine, said heating apparatus comprising:
   a plurality of heating heat exchange portions constructed and arranged to heat a passenger compartment of said vehicle by heat exchanging air with hot-water supplied from said engine;
   a flow control device for controlling flows of hot-water supplied from said engine to said heating heat exchange portions, said flow control device having a plurality of flow control valves corresponding to said heating heat exchange portions, respectively,
   each of said flow control valves including:
   first restriction means for forming a first restriction portion in an inlet for receiving hot water from said hot water supply source, second restriction means for forming a second restriction portion in an outlet for introducing hot water to said respective heating heat exchange portions, bypass opening means for forming a bypass opening opened at an intermediate pressure portion between said first restriction portion and said second restriction portion, a valve body for controlling each opening area of said first restriction portions, said second restriction portion, and said bypass opening, and a first housing for accommodating said first restriction means, said second restriction means, said bypass opening means, and said valve body; and valve body driving means for independently driving each of said valve bodies;

wherein said housing is commonly employed for said plurality of flow control valves and includes therein a bypass passage communicating with said bypass opening and bypassing said plurality of heating heat exchange portions.

13. A hot-water type heating apparatus according to claim 12, wherein, each of said heating heat exchange portions includes:

a core portion having a plurality of tubes disposed in parallel, for heat-exchanging air with hot-water flowing in said tubes; and tank portions disposed at both end sides of each tube, for distributing and leading hot-water, wherein said heating heat exchange portions are integrated in said tank portions.

14. A hot-water type heating apparatus according to claim 13, wherein said flow control device is attached integrally to either one of said tank portions of said heating heat exchange portions.

* * * * *

UNITED STATES PATENT AND TRADEMARK OFFICE
CERTIFICATE OF CORRECTION

PATENT NO. : 5,794,845
DATED : August 18, 1998
INVENTOR(S) : Koichi Ito et al

It is certified that error appears in the above-identified patent and that said Letters Patent is hereby corrected as shown below:

Col. 1, line 37, delete "as"

Col. 3, line 22, after "10l" insert --are--

Col. 3, line 27, delete "an" and substitute --the-- therefor

Col. 3, line 36, delete "an" and substitute --the-- therefor

Col. 3, line 49, delete "embodiment;" and substitute --embodiments;-- therefor

Col. 3, line 51, delete "blow-air" and substitute --blown-air-- therefor

Col. 4, line 9, delete "joins" and substitute --join-- therefor

Col. 4, line 47, delete "a" and substitute --the-- therefor

Col. 4, line 50, after "manner" insert --so--

Col. 5, line 24, after "of" insert --the--

Col. 5, line 37, after "for" insert --the--

Col. 6, line 17, delete "FIG, 3" and substitute --FIG. 3-- therefor

Col. 6, line 50, delete "in a closing" and substitute --a closed-- therefor

UNITED STATES PATENT AND TRADEMARK OFFICE
CERTIFICATE OF CORRECTION

PATENT NO.   : 5,794,845
DATED        : August 18, 1998
INVENTOR(S)  : Koichi Ito et al It is certified that error appears in the above-identified patent and that said Letters Patent is hereby corrected as shown below:

Col. 6, line 54, delete "Another" and substitute --The other-- therefor

Col. 8, line 11, delete "are"

Col. 8, line 48, delete "actuator" and substitute --actuators-- therefor

Col. 9, line 3, delete "corrugate" and substitute --corrugated-- therefor

Col. 9, line 22, after "brazing," insert --and--

Col. 9, line 27, after "such" insert --as--

Col. 9, line 61, delete "patten" and substitute --pattern-- therefor

Col. 9, line 66, delete "patten" and substitute --pattern-- therefor

Col. 10, line 2, delete "patten" and substitute --pattern-- therefor

Col. 10, line 20, delete "patten" and substitute --pattern-- therefor

Col. 10, line 45, delete "portions 44," and substitute --portions 45,-- therefor Col. 10, line 47, delete "portions 44," and substitute --portions 45,-- therefor Col. 11, line 7, after "have" insert --an--

Col. 11, line 9, after "not" insert --to--

Col. 11, line 16, delete "5" and substitute --54-- therefor

Col. 12, line 21, delete "grain, noise" and substitute --grain. Noise-- therefor Col. 12, line 32, delete "positions" and substitute --position-- therefor Col. 14, line 2, delete "gain" and substitute --grain-- therefor Col. 14, line 11, delete "the"

UNITED STATES PATENT AND TRADEMARK OFFICE
CERTIFICATE OF CORRECTION

PATENT NO. : 5,794,845
DATED : August 18, 1998
INVENTOR(S) : Koichi Ito et al

It is certified that error appears in the above-identified patent and that said Letters Patent is hereby corrected as shown below:

Col. 14, line 37, delete "valve 6" and substitute --valve 10-- therefor

Col. 14, line 49, delete "valve" and substitute --valves-- therefor

Col. 15, line 6, delete "embodiment, various type" and substitute --embodiment. Various types-- therefor Col. 15, line 28, delete "valve" and substitute --valves-- therefor Col. 16, lines 28-29, delete "FIG. 17A, each" and substitute --FIG. 17A. Each-- therefor Col. 16, line 55, delete "show" and substitute --shown-- therefor Col. 16, line 57, delete "the"

Col. 16, line 58, delete "the"

Col. 17, lines 30-31, delete "large excessively" and substitute --excessively large-- therefor Col. 17, line 43, delete "embodiment" and substitute --embodiments-- therefor Col. 17, line 49, delete "heat" and substitute --heater-- therefor Col. 17, line 51, delete "valve" and substitute --valves-- therefor (2nd occurrence)

Col. 17, line 59, delete "the"

Col. 18, line 5, delete "portions 6" and substitute --portion 6-- therefor

UNITED STATES PATENT AND TRADEMARK OFFICE
CERTIFICATE OF CORRECTION

PATENT NO. : 5,794,845
DATED : August 18, 1998
INVENTOR(S) : Koichi Ito et al

It is certified that error appears in the above-identified patent and that said Letters Patent is hereby corrected as shown below:

Col. 18, line 8, delete "portions 6" and substitute --portion 6-- therefor

Col. 18, line 19, delete "rotation." and substitute --rotation).-- therefor

Col. 18, line 27, delete "the"

Col. 18, line 34, delete "the"

Signed and Sealed this

Sixth Day of April, 1999

Q. TODD DICKINSON

Attest:

Attesting Officer

Acting Commissioner of Patents and Trademarks